US012521850B2

(12) United States Patent
Tucker et al.

(10) Patent No.: US 12,521,850 B2
(45) Date of Patent: Jan. 13, 2026

(54) NUT RUNNER ACCESSORY FOR POWER TOOL

(71) Applicant: Black & Decker Inc., New Britain, CT (US)

(72) Inventors: Benjamin Tucker, Ellicott City, MD (US); Thomas R. Kaye, Jr., Fallston, MD (US); Marco Lourenco, Baltimore, MD (US); Darren B. Moss, York, PA (US); Aland Santamarina, Woodbine, MD (US); Samuel Willits, Towson, MD (US)

(73) Assignee: Black & Decker Inc., New Britain, CT (US)

(*) Notice: Subject to any disclaimer, the term of this patent is extended or adjusted under 35 U.S.C. 154(b) by 461 days.

(21) Appl. No.: 18/046,753

(22) Filed: Oct. 14, 2022

(65) Prior Publication Data

US 2023/0128823 A1 Apr. 27, 2023

Related U.S. Application Data

(60) Provisional application No. 63/263,115, filed on Oct. 27, 2021.

(51) Int. Cl.
*B25B 21/00* (2006.01)
*B25F 5/00* (2006.01)

(52) U.S. Cl.
CPC ............ *B25B 21/007* (2013.01); *B25F 5/006* (2013.01)

(58) Field of Classification Search
CPC ........... B25F 5/026; B25F 5/025; B25F 5/006
USPC ..................... 81/57.14, 57.2, 57.3
See application file for complete search history.

(56) References Cited

U.S. PATENT DOCUMENTS

| 1,624,508 | A | 4/1927 | Reilly |
| 2,808,749 | A | 10/1957 | Lampke |
| 2,842,995 | A | 7/1958 | Johnson |
| 3,083,599 | A | 4/1963 | Slagle |
| 3,257,877 | A | 6/1966 | Philip et al. |
| 3,535,960 | A | 10/1970 | Borries |

(Continued)

FOREIGN PATENT DOCUMENTS

| CN | 203141397 U | 8/2013 |
| CN | 103962997 A | 8/2014 |

(Continued)

OTHER PUBLICATIONS

Extended European Search Report for Application No. 22203608.9 mailed Jun. 20, 2023, 10 pages.

(Continued)

*Primary Examiner* — Tom Rodgers
(74) *Attorney, Agent, or Firm* — Brake Hughes Bellermann LLP

(57) ABSTRACT

A nut runner accessory for a power-driven tool is provided. The nut runner accessory can include a gear assembly received in a housing. The gear assembly transfers an externally generated force to a driver head of the nut runner accessory. The driver head can include a plurality of stepped pockets that can receive and engage different sizes and/or configurations of nuts to be threaded onto/off of a threaded rod. The driver head can be counterweighted, to counteract imbalance generated due to an offset between a center of mass of the driver head and a center of rotation of the driver head.

19 Claims, 33 Drawing Sheets

(56) References Cited

U.S. PATENT DOCUMENTS

| | | | |
|---|---|---|---|
| 3,602,071 | A | 8/1971 | Juhasz |
| 3,620,105 | A | 11/1971 | Batten |
| D246,567 | S | 12/1977 | Bricker |
| 4,064,772 | A | 12/1977 | Boyd et al. |
| 4,318,315 | A | 3/1982 | Washburn |
| 4,622,870 | A | 11/1986 | Shirley |
| 5,107,729 | A | 4/1992 | Makhlouf |
| 5,339,710 | A | 8/1994 | Deadmond et al. |
| 5,454,283 | A | 10/1995 | Di |
| 5,460,062 | A | 10/1995 | Wilson |
| 5,522,285 | A | 6/1996 | Wilson et al. |
| 5,522,286 | A | 6/1996 | Wilson et al. |
| 5,537,897 | A | 7/1996 | Wilson |
| 5,544,553 | A | 8/1996 | Galat |
| 5,697,266 | A | 12/1997 | Wilson |
| 6,035,745 | A | 3/2000 | Kather |
| 6,131,492 | A | 10/2000 | Mai |
| 6,810,773 | B2 | 11/2004 | Trucchio |
| 7,311,025 | B1 | 12/2007 | Wilson |
| 7,513,179 | B2 | 4/2009 | Wilson |
| 7,631,580 | B2 | 12/2009 | Lu et al. |
| 7,942,084 | B2 | 5/2011 | Wilson et al. |
| 8,006,590 | B2 | 8/2011 | Light et al. |
| 8,166,849 | B2 | 5/2012 | Chan |
| 8,291,791 | B2 | 10/2012 | Light et al. |
| 8,353,230 | B2 | 1/2013 | Cole |
| 8,438,955 | B2 | 5/2013 | Wilson et al. |
| 8,590,431 | B2 | 11/2013 | Cook |
| 9,056,389 | B2 | 6/2015 | Buchanan |
| 9,205,542 | B2 | 12/2015 | Dedrickson et al. |
| 9,751,196 | B2 | 9/2017 | Hu et al. |
| 9,802,296 | B2 | 10/2017 | Hielscher et al. |
| 10,549,410 | B2 | 2/2020 | Hu et al. |
| 10,625,402 | B2 | 4/2020 | Jensen |
| 10,926,381 | B2 | 2/2021 | Wilson |
| 11,161,226 | B2 | 11/2021 | Sawa et al. |
| 11,192,220 | B2 | 12/2021 | Abunameh et al. |
| 11,759,925 | B2 | 9/2023 | Sawa et al. |
| 2004/0163499 | A1* | 8/2004 | Gammon .............. B25B 13/481 81/119 |
| 2006/0236816 | A1 | 10/2006 | Picou |
| 2008/0245193 | A1 | 10/2008 | Lipka |
| 2009/0229425 | A1 | 9/2009 | Riggio et al. |
| 2010/0257979 | A1 | 10/2010 | Zhan |
| 2011/0113930 | A1 | 5/2011 | Liao |
| 2011/0162486 | A1 | 7/2011 | Lee et al. |
| 2012/0103142 | A1 | 5/2012 | Sroka |
| 2014/0251091 | A1 | 9/2014 | Hui |
| 2015/0314427 | A1 | 11/2015 | Carlsson et al. |
| 2016/0023289 | A1* | 1/2016 | Moss ................. B25F 3/00 30/500 |
| 2016/0031067 | A1 | 2/2016 | Batt |
| 2016/0221163 | A1 | 8/2016 | Trucchio |
| 2017/0057057 | A1 | 3/2017 | Wilson, Jr. |
| 2019/0247984 | A1 | 8/2019 | Sawa et al. |
| 2020/0130150 | A1 | 4/2020 | Nick et al. |
| 2020/0262034 | A1 | 8/2020 | Hoppe et al. |
| 2021/0187708 | A1 | 6/2021 | Beguin |
| 2022/0024004 | A1 | 1/2022 | Sawa et al. |
| 2022/0118588 | A1 | 4/2022 | Stewart |
| 2023/0415311 | A1 | 12/2023 | Tucker et al. |

FOREIGN PATENT DOCUMENTS

| | | |
|---|---|---|
| CN | 104889919 A | 9/2015 |
| CN | 106392978 A | 2/2017 |
| CN | 206393529 U | 8/2017 |
| CN | 109079694 A | 12/2018 |
| CN | 114516007 A | 5/2022 |
| DE | 3219980 A1 | 6/1983 |
| DE | 8613789 U1 | 7/1986 |
| EP | 4212281 A1 | 7/2023 |
| GB | 2548390 A | 9/2017 |
| JP | 6041035 B1 | 11/2016 |
| WO | 2019160868 A1 | 8/2019 |
| WO | 2020086449 A1 | 4/2020 |
| WO | 2020222230 A1 | 11/2020 |

OTHER PUBLICATIONS

Extended European Search Report, EP Application No. 23206986.4, Apr. 12, 2024, 5 pages, EPO.

* cited by examiner

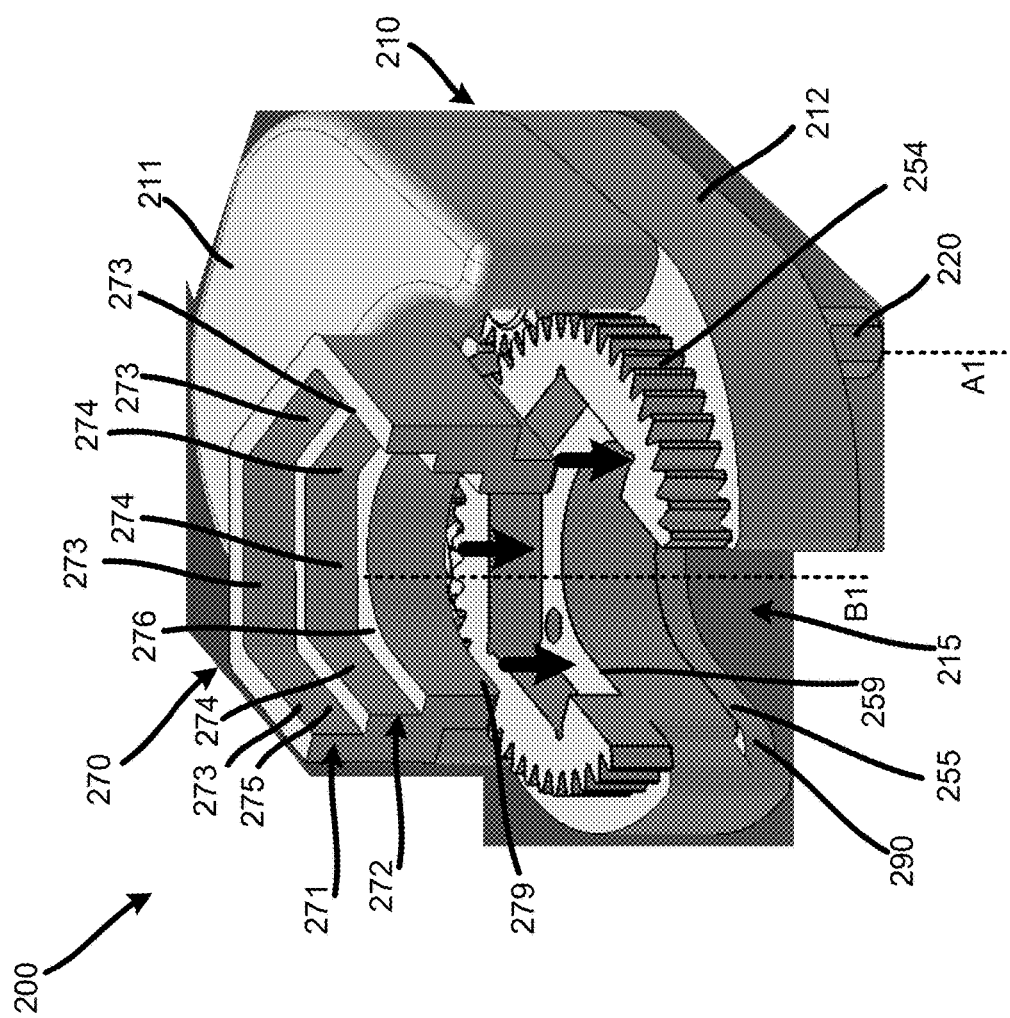
FIG. 2A(1)

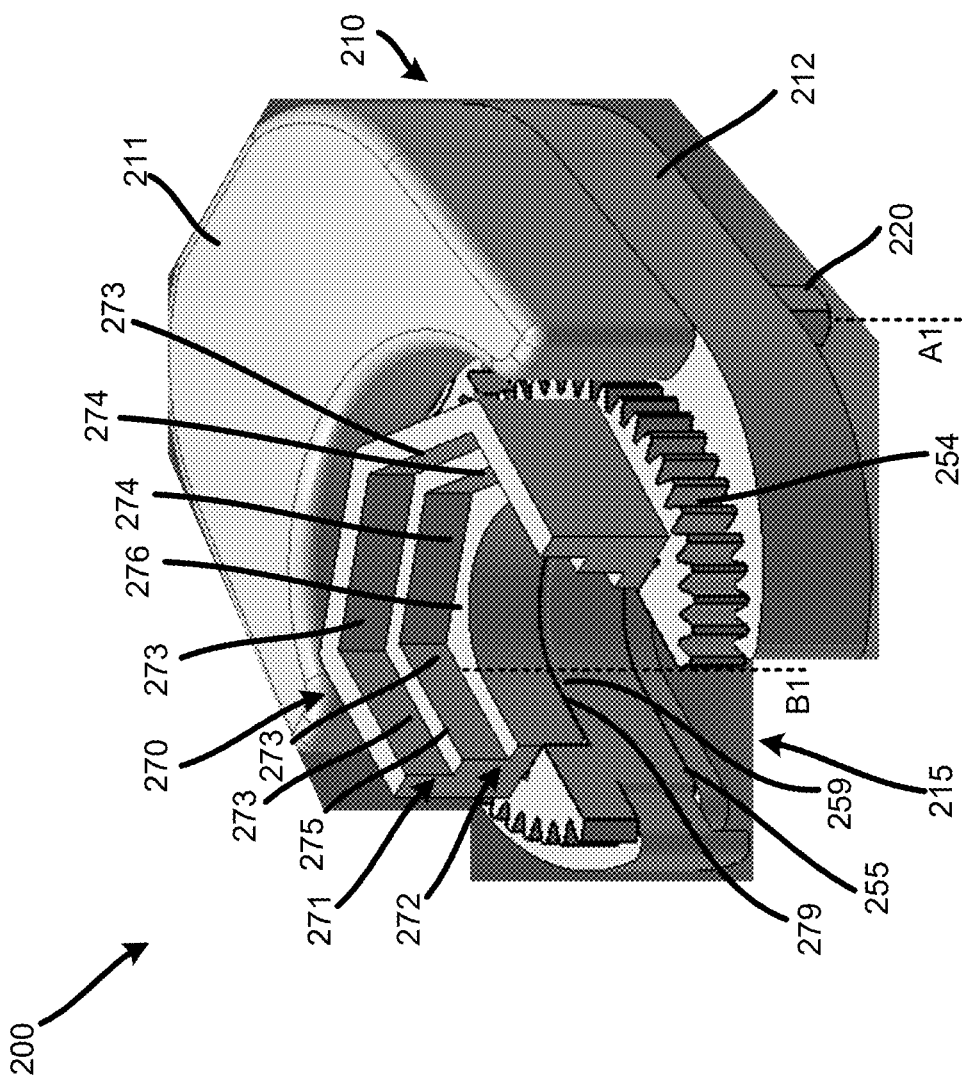
FIG. 2A(2)

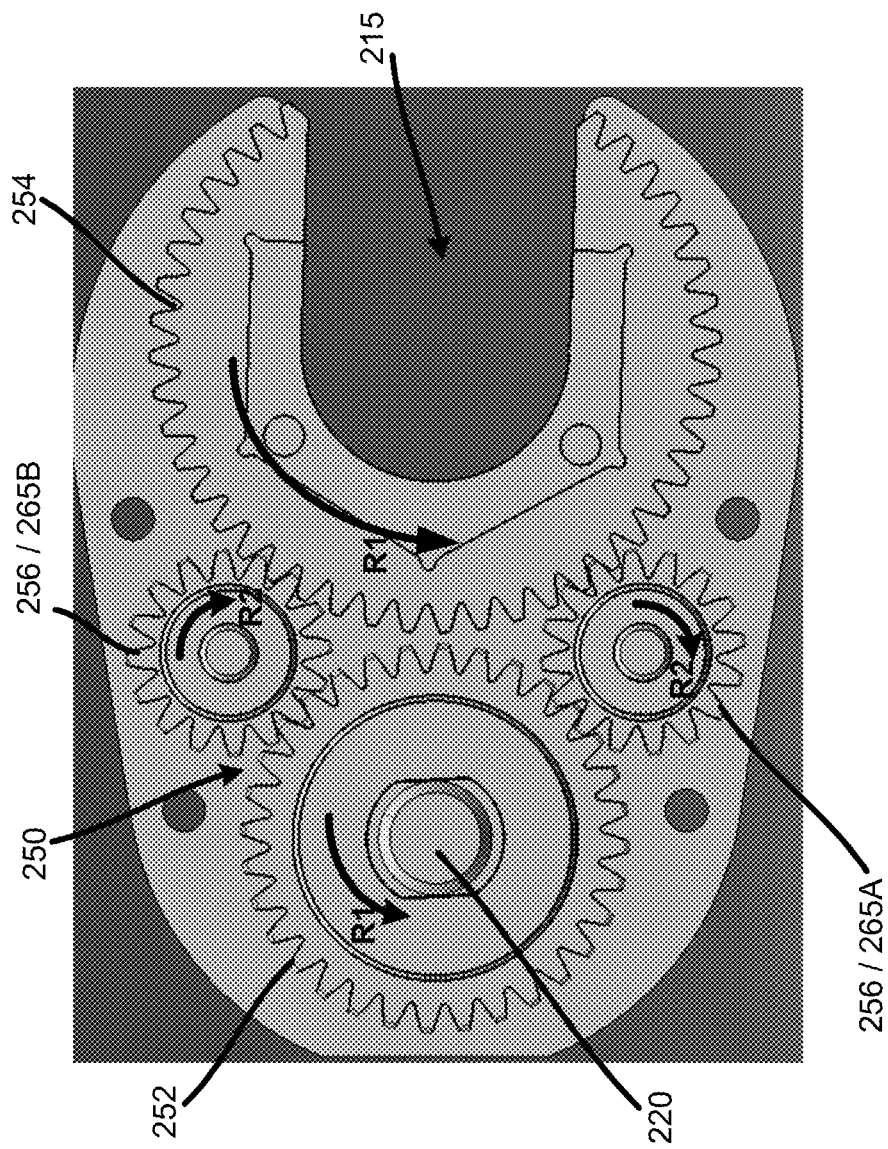

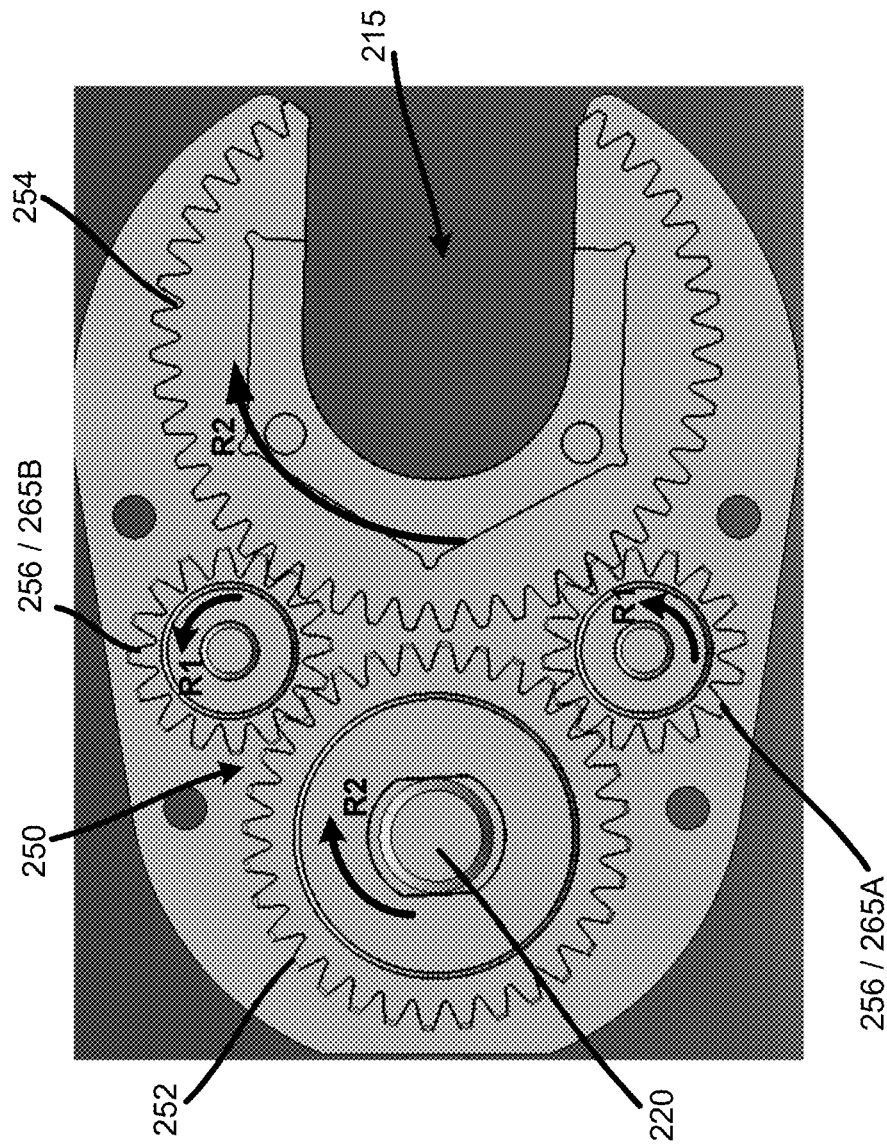
FIG. 2E(2)

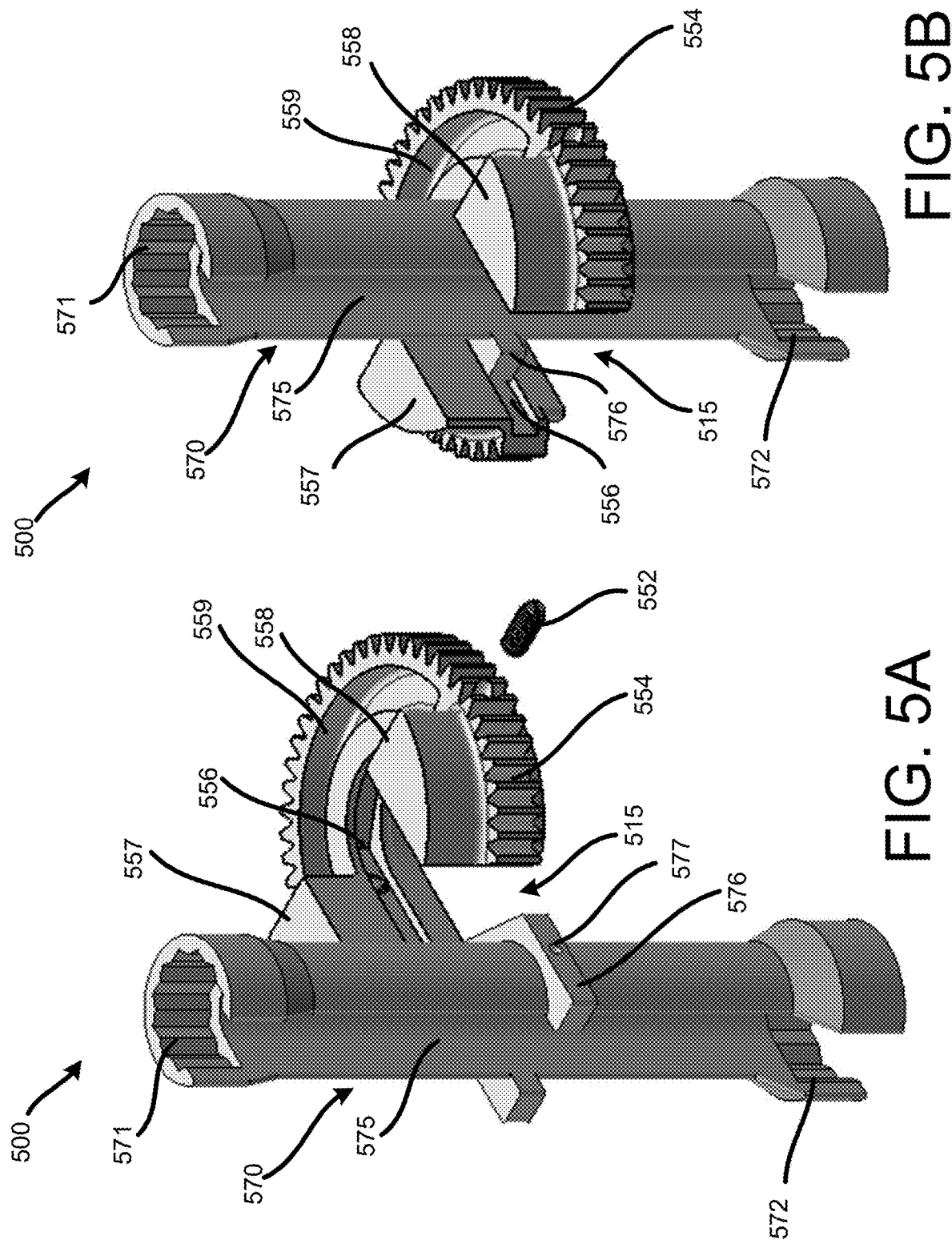

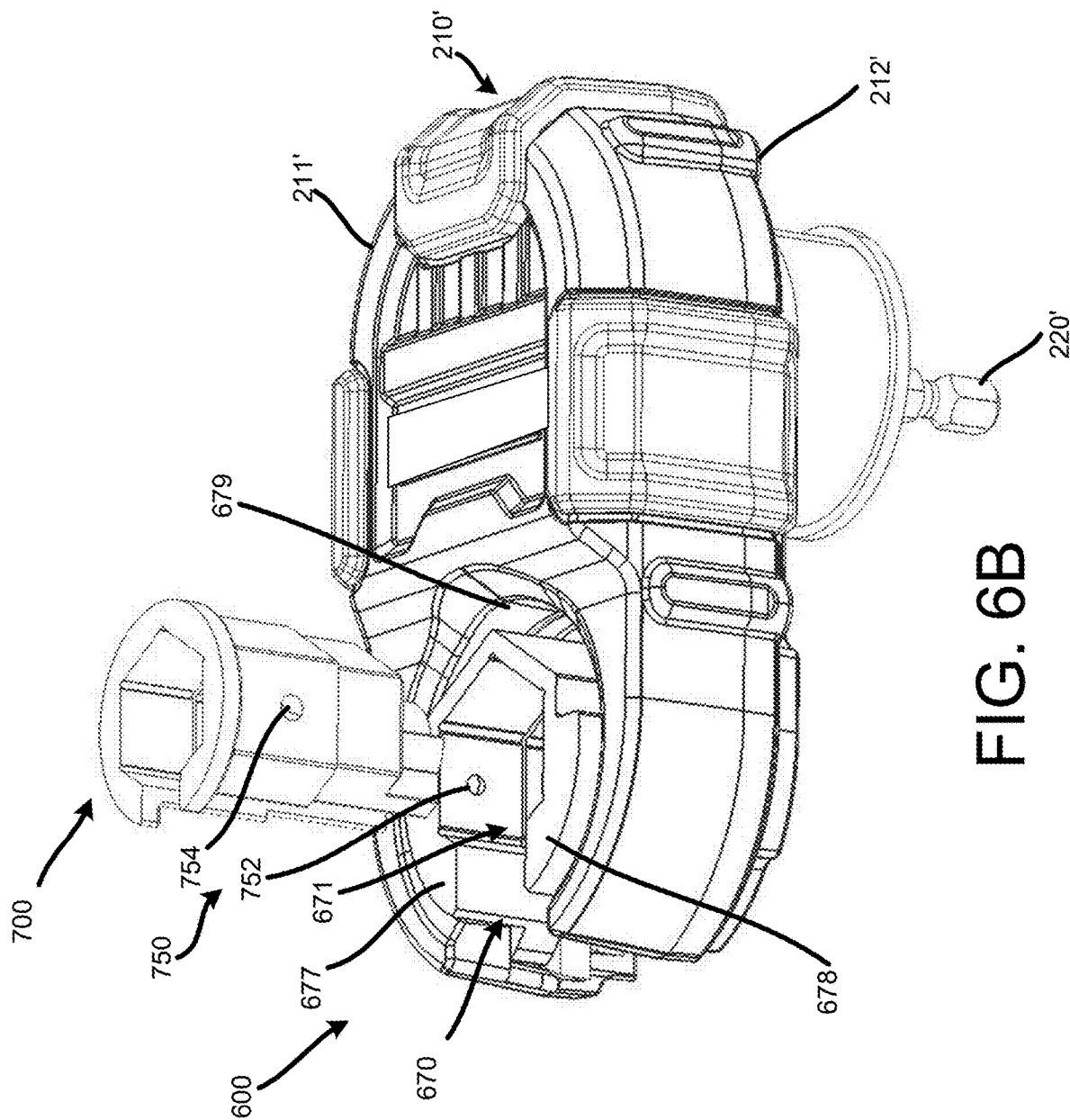

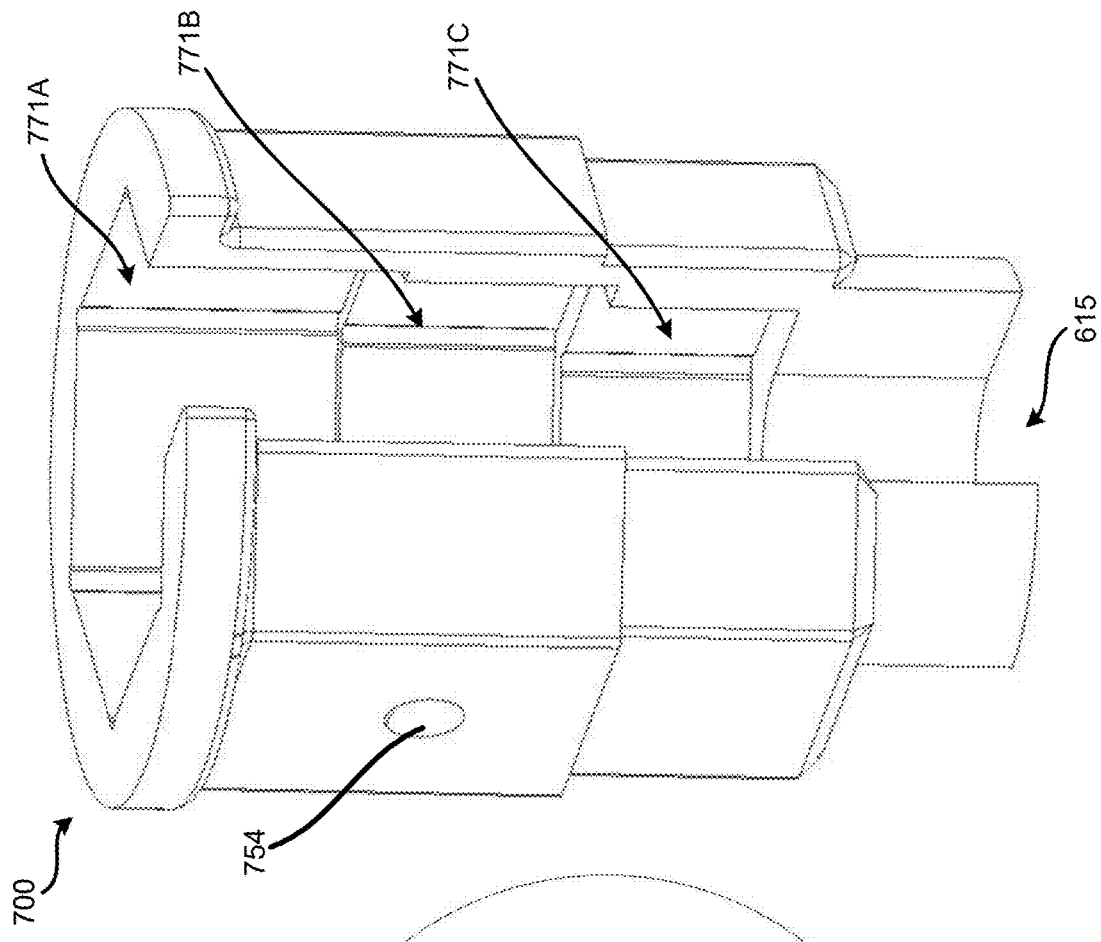
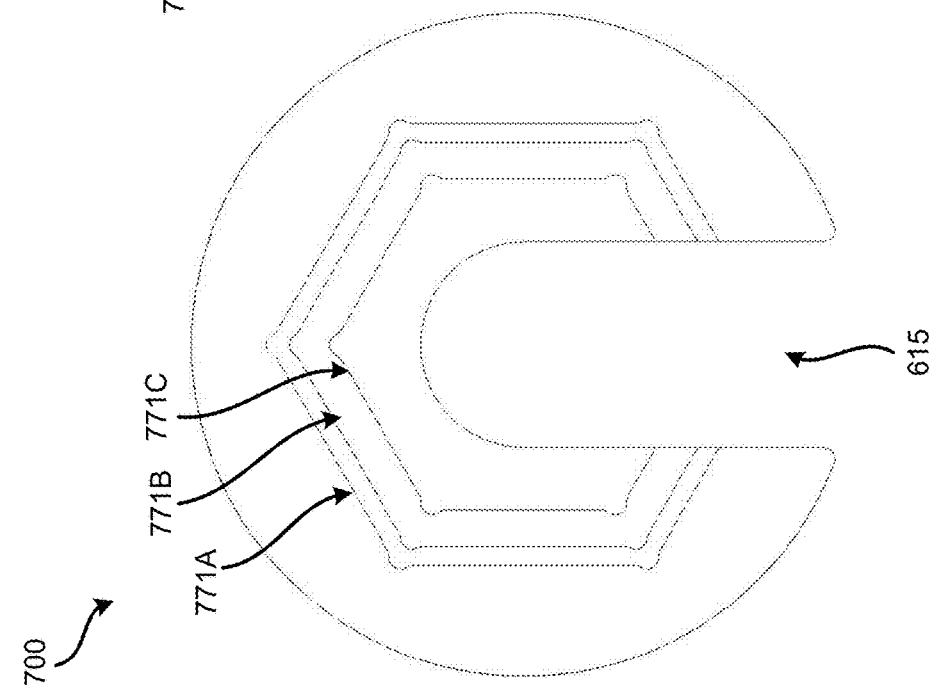
FIG. 7B
FIG. 7A

NUT RUNNER ACCESSORY FOR POWER TOOL

CROSS-REFERENCE TO RELATED APPLICATION

This application claims priority to U.S. Provisional Patent Application No. 63/263,115, filed on Oct. 27, 2021, entitled "NUT RUNNER ACCESSORY FOR POWER TOOL," the disclosure of which is incorporated herein by reference in its entirety.

FIELD

This relates to a nut runner accessory for a power-driven tool, e.g., a rotary power tool such as a drill, a drill/driver, or an impact driver.

BACKGROUND

Manual movement of a nut along a threaded rod may be time consuming and fatiguing, whether by hand or with the assistance of a manually operated hand tool. In some situations, a condition of the threaded rod and/or the nut due to, for example, debris, rust, paint, and other types of degradation may complicate the threaded engagement of the nut and rod and/or manual movement of the nut along the rod. Installation environments having limited access and/or workspace may preclude the use of hand tools, such as a wrench, to assist in the movement of the nut along the threaded rod. An accessory tool that can be coupled to existing power-driven tools to facilitate the movement of a nut along a threaded rod may provide time savings, may reduce user fatigue, and may provide for a more secure coupling of elements by the threaded rod and nut.

SUMMARY

In one general aspect, a nut runner accessory for a power-driven tool includes a housing; an input shaft at least partially received in the housing, the input shaft having a first end portion configured to receive a rotary input torque from a power-driven tool; a gear assembly received in the housing, including an input gear configured to receive rotary input from the input shaft, and an output gear configured to be rotatably driven in response to rotation of the input gear; and a driver head coupled to an output gear of the gear assembly, wherein the driver head is configured to be rotatably driven about an output axis in response to rotation of the output gear. In some examples, the driver head includes a base defining a slot having an open end portion; a plurality of stepped pockets extending from the base along the output axis, each stepped pocket of the plurality of stepped pockets including a base wall; a plurality of side walls extending upward from the base wall.

In some implementations, each of the plurality of stepped pockets has a different cross-sectional dimension corresponding to a nut to be engaged by the respective stepped pocket. In some examples, the base of the driver head is configured to be removably coupled to the output gear such that the driver head rotates together with the output gear. The output gear may include a slot having an open end portion, corresponding to the slot having the open end portion defined by the base of the driver head. In some implementations, the plurality of side walls extend substantially orthogonally upward from the base wall; and the plurality of side walls includes at least three side walls corresponding to at least three sides of a polygonal nut to be engaged by the respective stepped pocket.

In some implementations, one or more counterweight features are defined on the driver head, wherein the one or more counterweight features are positioned to counteract an imbalance generated during operation due to an offset between a center of rotation and a center of mass of the driver head. In some examples, the one or more counterweight features includes a first counterweight feature defined by a first mass positioned at a first end of the plurality of stepped pockets corresponding to a first side of the open end portion of the slot; and a second counterweight feature defined by a second mass positioned at a second end of the plurality of stepped pockets corresponding to a second side of the open end portion of the slot.

In some implementations, a first idler gear and a second idler gear are positioned between the input gear and the output gear of the gear assembly, wherein at least one of the first idler gear or the second idler gear is configured be in meshed engagement between the input gear and the output gear as the output gear and the driver head coupled thereto rotate in response to rotation of the input gear. The gear assembly may be configured such that a rotational speed of the driver head is less than a rotational speed of the input shaft. The housing may be configured to be coupled to a brace assembly that is coupled to the power-driven tool to stabilize the housing relative to the power tool.

In another general aspect, a nut runner accessory for a power-driven tool includes a housing; an input shaft at least partially received in the housing and configured to be to be driven rotatably by a power-driven tool; a gear assembly received in the housing, including an input gear configured to be driven rotatably by rotation of the input shaft and an output gear configured to be driven rotatably about an output axis upon rotation of the input gear; a counterweighted driver head provided on an output gear of the gear assembly so as to rotate together with the output gear, wherein the output gear and the counterweighted driver head define a slot having an open end portion; and one or more counterweight features provided on at least one of the driver head or the output gear to counteract an imbalance generated during operation due to an offset between the center of rotation and the center of mass of the driver head.

In some implementations, the counterweight features are configured such that a center of rotation of the driver head and output gear coincides or approximately coincides with a center of mass of the driver head and output gear. In some examples, the one or more counterweight features includes a first counterweight feature defined by a first mass positioned at a first side of the open end portion of the slot; and a second counterweight feature defined by a second mass positioned at a second side of the open end portion of the slot. In some implementations, a third counterweight feature is defined by a recess formed in an upper portion of the output gear, corresponding to an outer periphery of the driver head. In some examples, the driver head and the output gear are integrally formed.

In some implementations, the driver head includes a plurality of stepped pockets extending upward from an upper portion of the output gear and facing the open end portion of the slot, each stepped pocket of the plurality of stepped pockets including a base wall; and a plurality of side walls extending upward from the base wall. In some examples, each of the plurality of stepped pockets has a different cross-sectional dimension corresponding to a nut to be engaged by the respective stepped pocket. In some examples, the plurality of side walls extend substantially orthogonally upward from the base wall; and the plurality of side walls includes four side walls corresponding to four sides of a hexagonal nut to be engaged by the respective stepped pocket.

In some implementations, the driver head includes an elongated tube having a first driver engagement socket at one end of the tube. In some examples, the elongated tube is a split tube having a substantially C-shaped cross-section. In some examples, the driver head includes a second driver engagement socket at a second end of the tube. In some examples, the first socket has an at least partially hex shape or splined configuration. In some examples, the counterweight features include a first counterweight feature defined by a first mass positioned at a first side of the open end portion of the slot in the output gear and a second counterweight feature defined by a second mass positioned at a second side of the open end portion of the slot in the output gear.

In another general aspect, a nut runner accessory for a power-driven tool includes a housing; an input shaft at least partially received in the housing, the input shaft having a first end portion configured to receive a rotary input torque from a power-driven tool; a gear assembly received in the housing, including an input gear configured to receive rotary input from the input shaft, and an output gear configured to be rotatably driven in response to rotation of the input gear; a driver head coupled to an output gear of the gear assembly, wherein the driver head is configured to be rotatably driven about an output axis in response to rotation of the output gear, wherein the driver head includes a socket member configured to drive a nut along a threaded shaft; and an engagement structure coupled to the housing adjacent the input shaft, the engagement structure configured to couple the housing to an external tool.

In some implementations, the engagement structure is configured to be coupled to a brace assembly that is coupled to a power tool housing to stabilize the nut runner accessory housing relative to the power tool housing. In some examples, the engagement structure includes a cylindrical coupling member; a flange extending radially outward from an intermediate portion of the cylindrical coupling member and coupled to a housing of the accessory tool, such that a first portion of the cylindrical coupling member is positioned within the housing and a second portion of the cylindrical coupling member is positioned outside of the housing; a first L-shaped slot and a second L-shaped slot defined in an outer circumferential portion of the second portion of the housing; and a radial tab rotatably coupled between the flange and the second portion of the cylindrical coupling member, wherein the tab is biased in a direction away from the flange. In some examples, the first L-shaped slot and the second L-shaped slot are formed at diametrically opposed positions on the outer circumferential portion of the second portion of the cylindrical coupling member. In some examples, the first L-shaped slot is configured to be slidably received and engaged in a corresponding first recess defined a cylindrical coupling member of an engagement structure of a mating device; and the second L-shaped slot is configured to be slidably received and engaged in a corresponding second recess defined the cylindrical coupling member of the engagement structure of the mating device. In some implementations, the cylindrical coupling member is positioned around an input shaft extending through the housing, wherein a first portion of the input shaft is received within the housing and a second portion of the input shaft is positioned outside of the housing.

In some implementations, a coupling nut is coupled to the second portion of the input shaft and a sleeve positioned between the coupling nut and the second portion of the cylindrical coupling member, wherein the first portion of the input shaft is configured to receive a force from an external device coupled thereto by the engagement structure; and an end of the second portion of the input shaft is fixed to an input gear within the housing such that the input shaft is configured to transmit the force received from the external device to the input gear to drive the input gear.

The details of one or more implementations are set forth in the accompanying drawings and the description below. Other features will be apparent from the description and drawings, and from the claims.

BRIEF DESCRIPTION OF THE DRAWINGS

FIG. 2A (1) is a partially exploded top perspective view of an example nut runner accessory, in accordance with implementations described herein.

FIG. 2A (2) is an assembled top perspective view of the example nut runner accessory shown in FIG. 2A (1).

FIG. 2E (1) is a plan view of an example gear assembly of the example nut runner accessory shown in FIGS. 2A-2D, illustrating a first operational state of an example gear assembly of the example nut runner accessory, in accordance with implementations described herein.

FIG. 2E (2) is a plan view of the example gear assembly of the example nut runner accessory shown in FIGS. 2A-2D, illustrating a second operation state of the example gear assembly of the example nut runner accessory.

FIGS. 5A and 5B are perspective views of an example nut runner tool for a nut runner accessory, in accordance with implementations described herein.

FIGS. 6A and 6B are perspective views of an example nut runner accessory, in accordance with implementations described herein.

FIGS. 7A-7D illustrate an example insert shown in FIGS. 6A and 6B.

DETAILED DESCRIPTION

A nut runner accessory, in accordance with implementations described herein, can be coupled to a rotary power-driven power tool, such as, for example, a drill, a drill/driver, an impact driver, and other such rotary power-driven tools, to facilitate the movement of the nut along the threaded rod. The nut runner accessory can engage the nut, and can move, or spin the nut along the threaded rod in response to a force applied to the nut runner accessory by the power-driven tool. A nut runner accessory, in accordance with implementations described herein, can transmit a rotational force from the power-driven tool to in turn rotate the nut engaged with the threaded rod, to cause movement of the nut along the threaded rod in both a first longitudinal direction and a second longitudinal direction of the threaded rod, based on a rotational direction of the force transmitted by the power-driven tool. A nut runner accessory, in accordance with implementations described herein, may reduce the time to complete a particular task involving the movement of the nut on the threaded rod, thus enhancing utility and functionality of the power-driven tool to which the nut runner accessory is coupled.

Figure 1A:
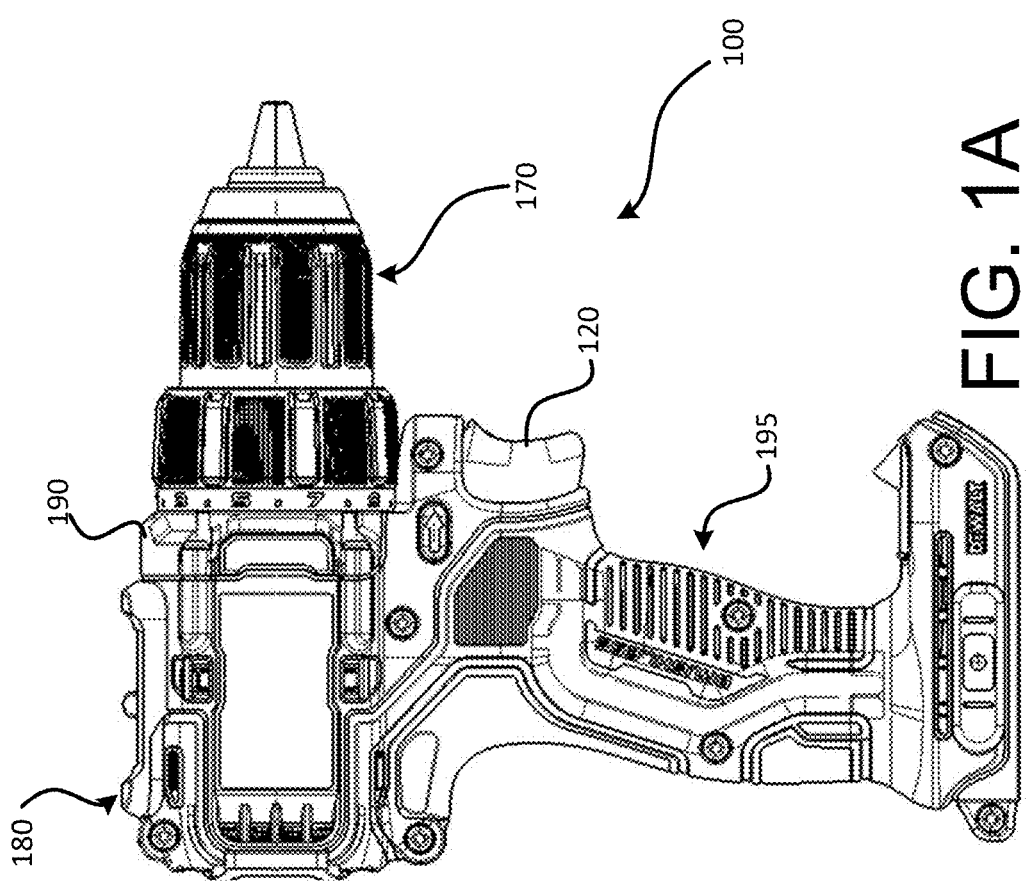
FIG. 1A is a side view of an example first rotary power tool for use with an example accessory tool.

FIG. 1A is a side view of a first example rotary power-driven tool 100 in the form of a drill or drill/driver for use with a nut runner accessory. The drill/driver shown in FIG. 1A includes a chuck assembly 170 that provides for coupling of output tools and/or accessories to an output device of the tool 100, including a nut runner accessory, in accordance with implementations described herein. The example power-driven tool 100 shown in FIG. 1A includes a housing 190, in which components such as, for example, a motor, a transmission, the output assembly (not shown in FIG. 1A) and the like are housed. In some examples, the transmission transmits a force generated by the motor to the output tool and/or accessory coupled at the chuck assembly 170 via the output assembly, to drive the output tool and/or accessory coupled at the chuck assembly 170 to perform an operation on a workpiece. The chuck assembly 170 is provided at an end portion of the housing 190, corresponding to a working end of the example power-driven tool 100. A trigger 120 for triggering operation of the tool 100 is provided at a handle portion 195 of the housing 190. One or more selection devices 180 accessible to a user at the outside of the housing 190 provide for user control of the example power-driven tool 100. For example, the one or more selection devices 180 can be manipulated by the user to turn the tool 100 on and off, to set an operation mode, to set an operational speed, an operational direction and the like.

Figure 1B:
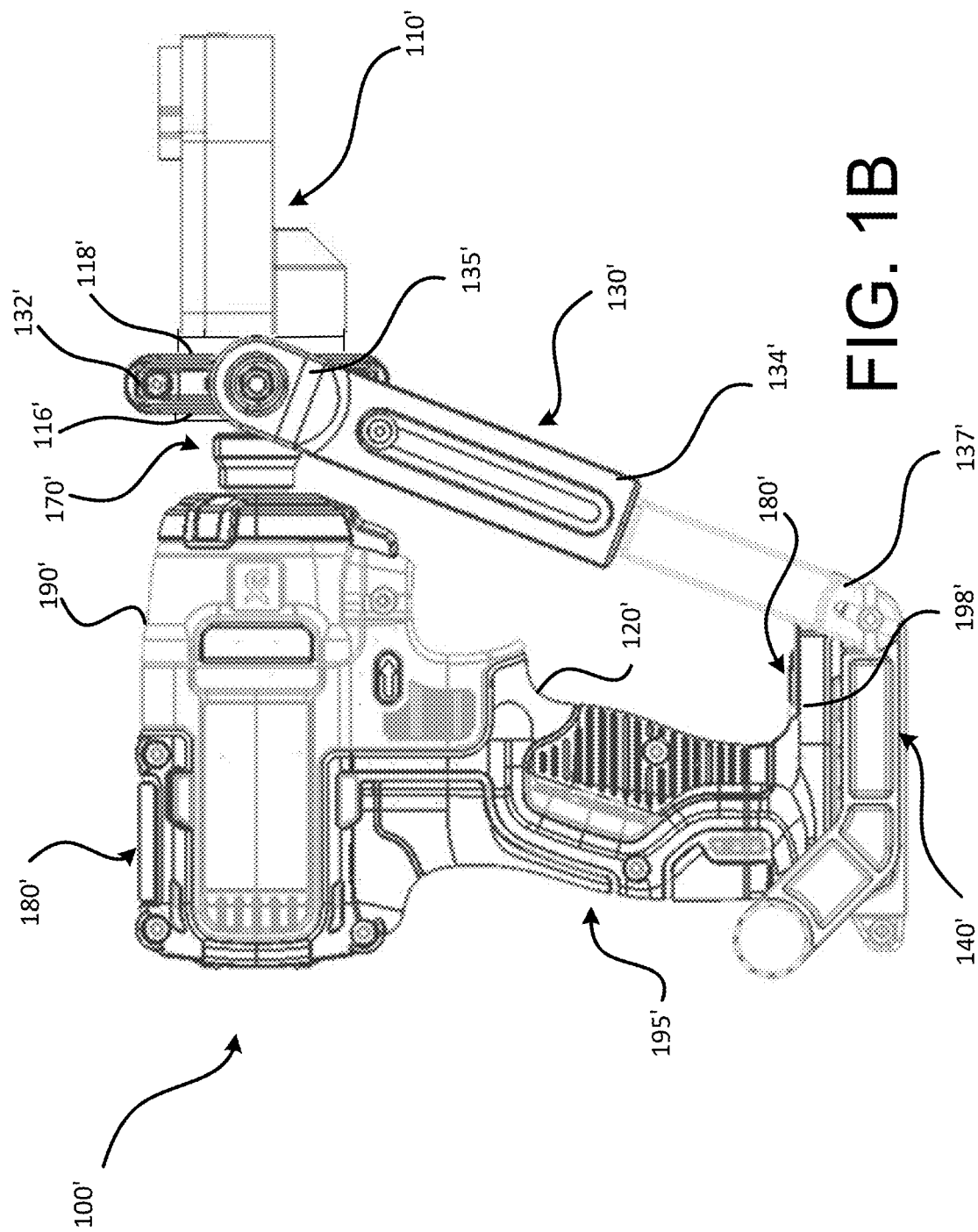
FIG. 1B is a side view of an example second rotary power tool, illustrating a coupling of an example accessory tool to the second rotary power tool.
Figure 1C:
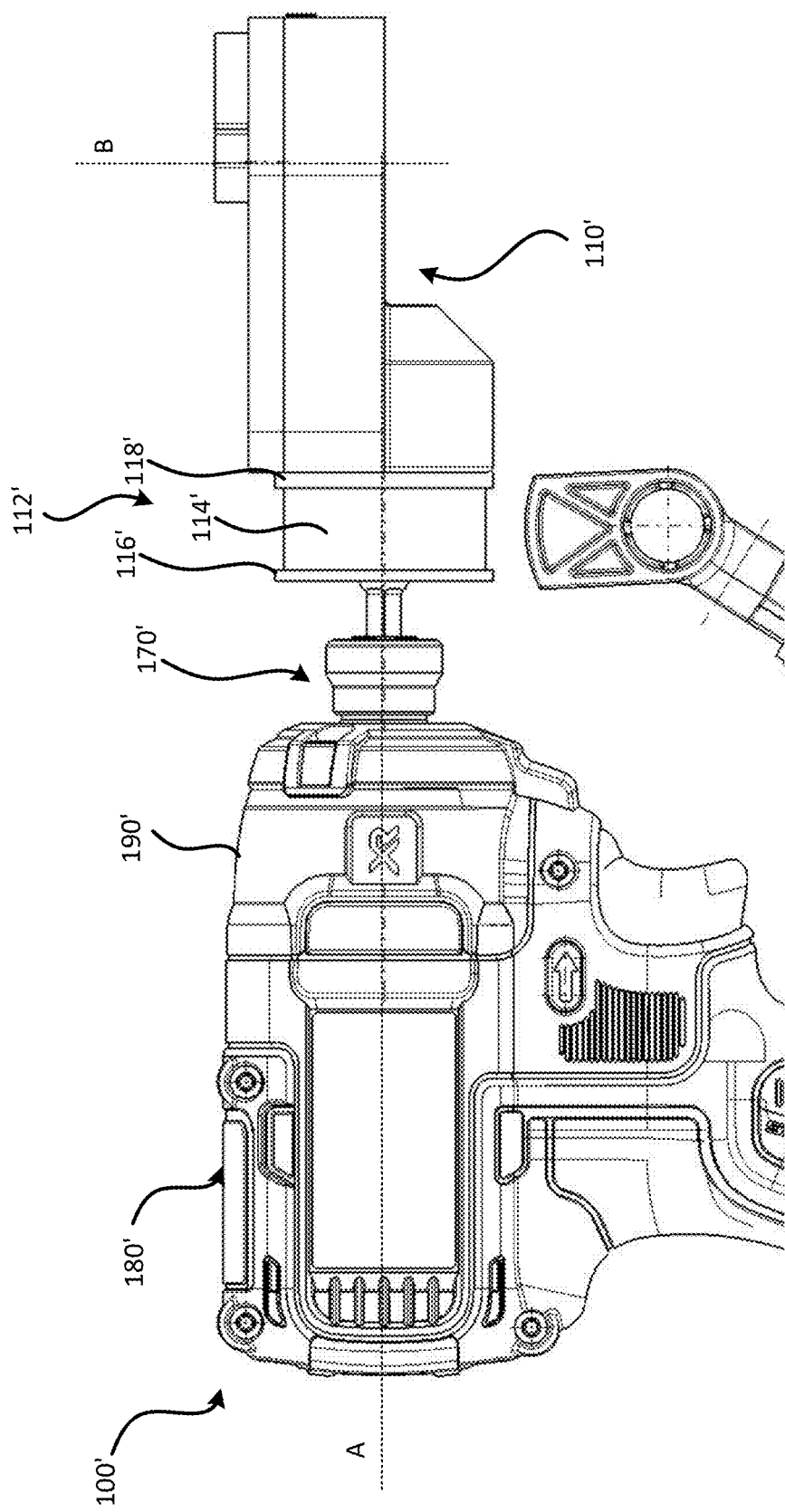
FIG. 1C is a partial side view of the example second rotary power tool and the example accessory tool shown in FIG. 1B.
Figure 1D:
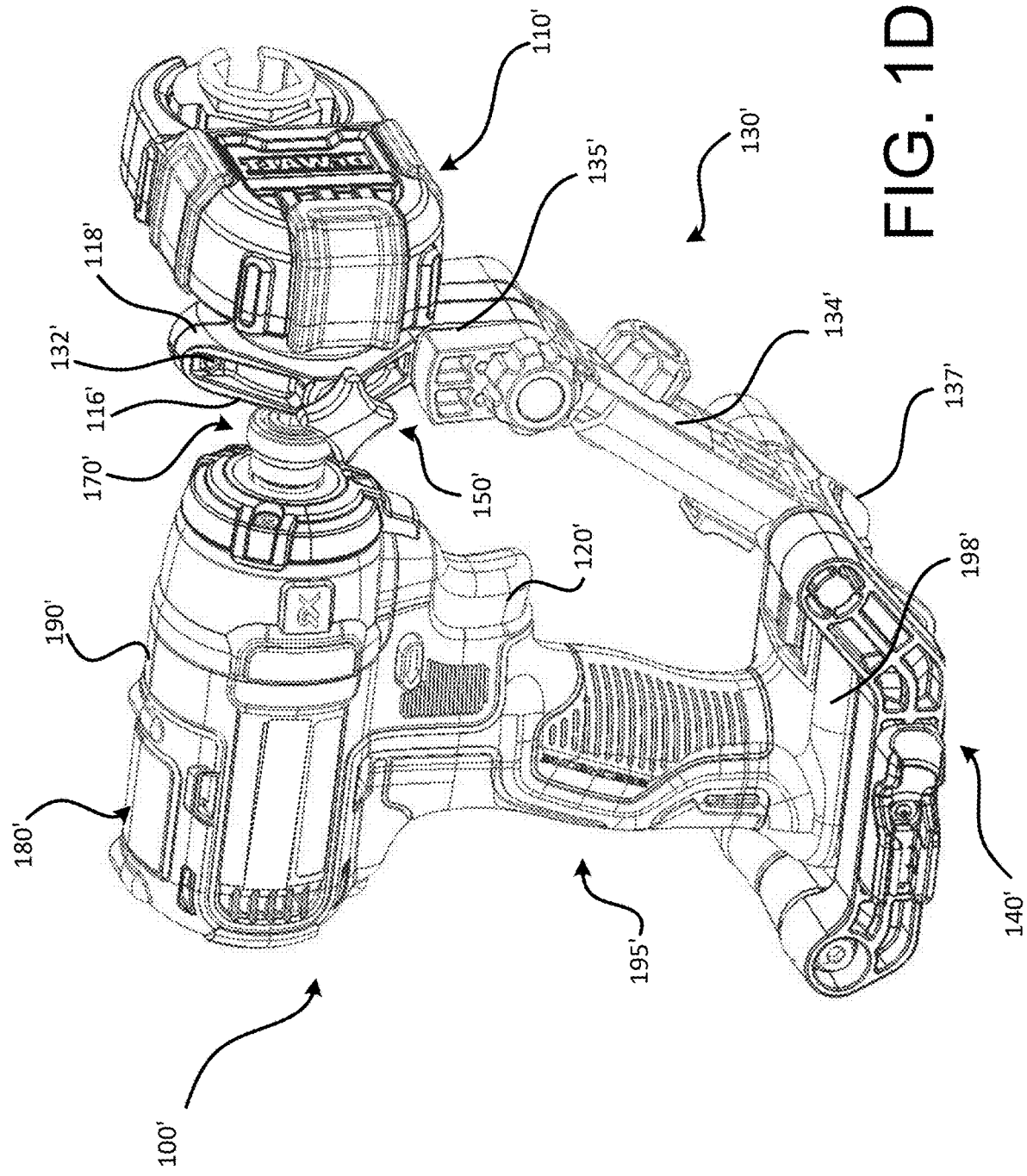
FIG. 1D is a perspective view of the example second rotary power, illustrating the coupling of an example accessory tool to the example second rotary power tool.
Figure 1E:
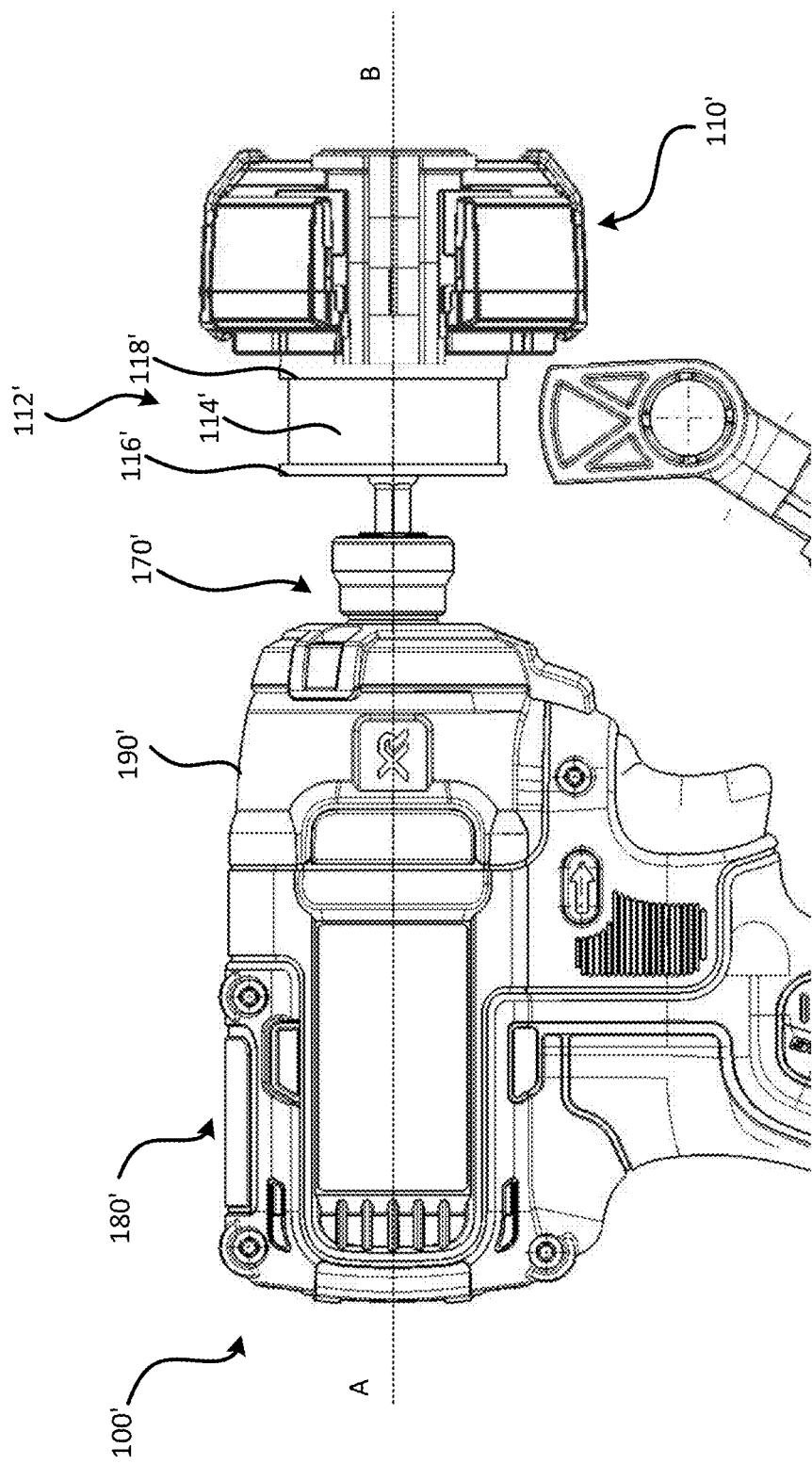
FIG. 1E is a partial side view of the example second rotary power tool and the example accessory tool shown in FIG. 1D.
Figure 1G:
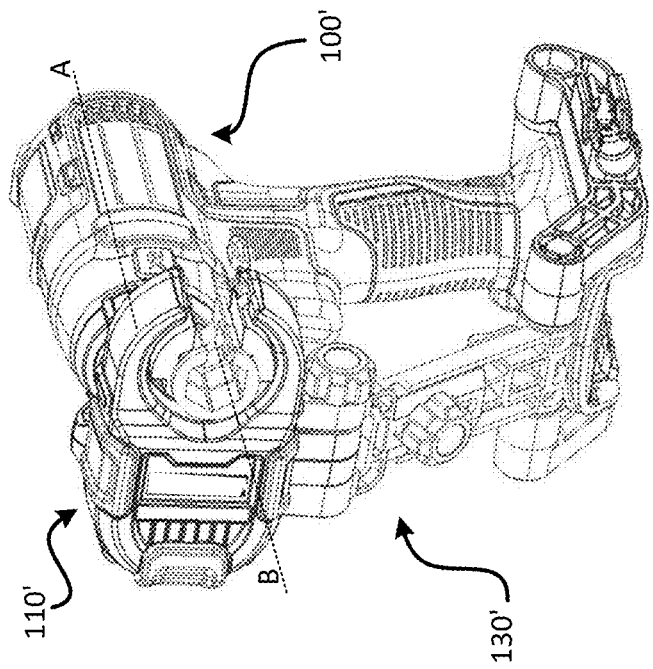
FIGS. 1F-1I illustrate example orientations of an example accessory tool with respect to an example rotary power tool.
Figure 1F:
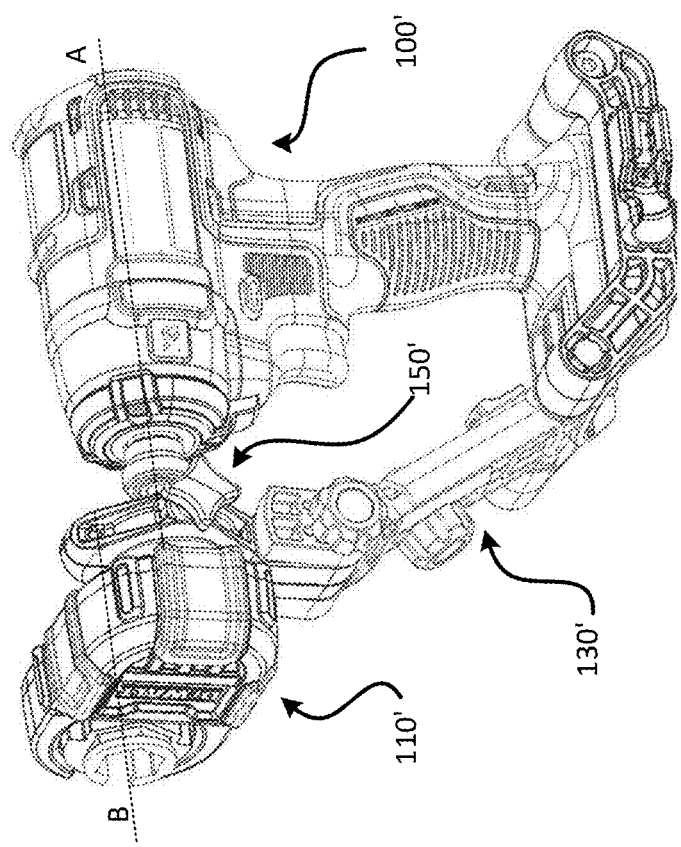
Figure 1I:
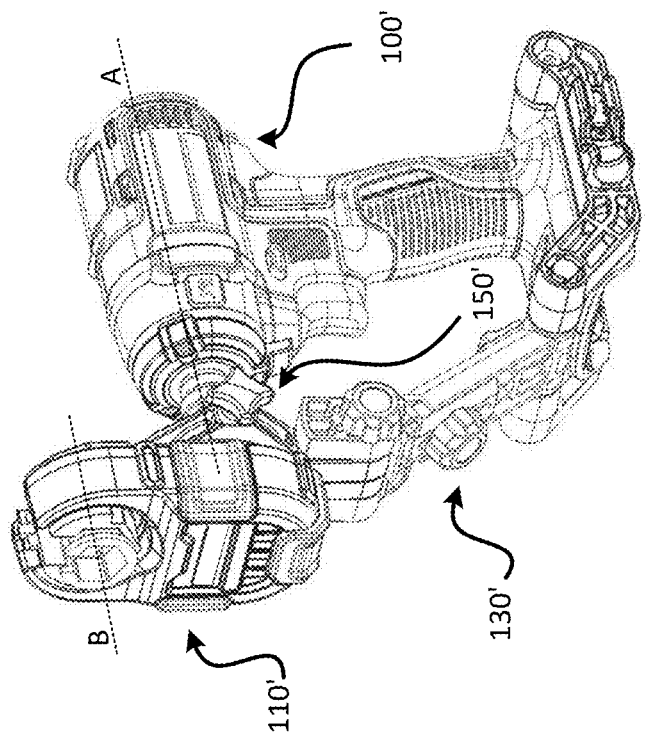
Figure 1H:
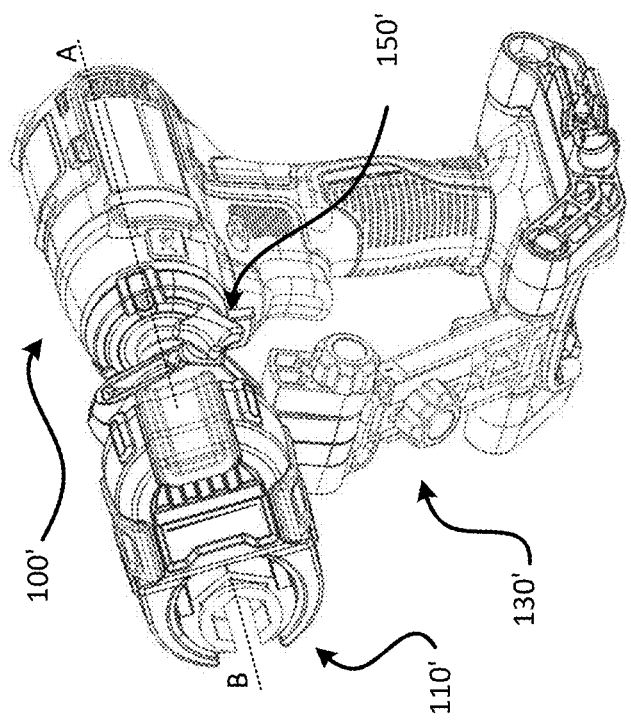

FIGS. 1B and 1C are side views of a second example of a power-driven tool 100' in the form of an impact driver for use with an accessory tool, such as one of the nut runner accessory tools described herein. In particular, FIGS. 1B and 1C illustrate the coupling of the example impact driver to a housing of an example accessory tool 110'. The example power-driven tool 100', in the form of an impact driver in the example shown in FIGS. 1B and 1C, includes a tool holder 170' that provides for coupling of output tools and/or accessories to an output device of the power-driven tool 100', including a nut runner accessory, in accordance with implementations described herein. The example power-driven tool 100' includes a housing 190', in which components such as, for example, a motor, a transmission, a rotary impact or Pott-style impact mechanism (not shown in FIGS. 1A-1C) and the like are housed. In some examples, the transmission and impact mechanism transmits a rotary impact force to an output tool and/or accessory tool coupled at the tool holder 170' to perform an operation on a workpiece. The tool holder 170' may comprise a quick-release hex receptacle and is provided at an end portion of the housing 190', corresponding to a working end of the example power-driven tool 100'. A trigger 120' for triggering operation of the tool 100' is provided at a handle portion 195' of the housing 190'. One or more selection devices 180' accessible to a user at the outside of the housing 190' provide for user control of the example power-driven tool 100'. For example, the one or more selection devices 180' can be manipulated by the user to turn the tool 100' on and off, to set an operation mode, to set an operational speed, an operational direction and the like. The tool 100' may be provided with an angled brace assembly 130', similar to one of the braces described and shown in commonly owned U.S. Provisional Application No. 63/175,938, filed Apr. 16, 2021, titled "Power Tool Accessory System with Brace," commonly owned U.S. Provisional Application No. 63/217,874, filed Jul. 2, 2021, titled "Power Tool Accessory System with Brace," and commonly owned U.S. Provisional Application No. 63/263, 419, filed Nov. 2, 2021, titled "Power Tool Accessory System with Brace," each of which is incorporated by reference. The brace assembly 130' is illustrated in FIG. 1B, simply for purposes of discussion and illustration. Any of the brace assemblies described in the aforementioned patent applications may be applicable.

The brace assembly 130' may include a clamping assembly 140' configured to be removably and rigidly attached to a base portion 198' of the handle portion 195' of the housing 190'. A collar 132' is configured to be coupled to a rear end portion of a housing of an accessory tool 110' as shown in FIGS. 1B and 1C, such as, for example, a housing of one of the nut runner accessory tools described herein. An arm assembly 134' has a first end portion 135' pivotally coupled to the collar 132' and an opposite second end portion 137' coupled to the clamping assembly 140'. FIG. 1B illustrates the brace assembly 130' coupled to the power-driven tool 100' via the clamping assembly 140', and the collar 132' coupled between the first end portion 135' of the arm assembly 134' and the housing of the example accessory tool 110'.

FIG. 1C illustrates the example accessory tool 110' coupled to the example power-driven tool 100' at the tool holder 170'. As shown in FIG. 1C, in some examples, the housing of the accessory tool 110' may include an extension 112' for coupling of the accessory tool 110' to the example power-driven tool 100 shown in FIG. 1A and/or the example power-driven tool 100' shown in FIG. 1B. In some examples, the extension 112' may be substantially cylindrical. The extension 112' may include a coupling portion 114' between a first flange 116' and a second flange 118'. When coupling the brace assembly 130' to the housing 110' of the example accessory tool, the collar 132' may be coupled on the coupling portion 114' and received between the first flange 116' and the second flange 118' to couple the housing of the accessory tool 110' to the brace assembly 130'. Further details of the brace assembly may be found in the aforementioned patent applications.

In the example shown in FIGS. 1B and 1C, an output axis B of the example accessory tool 110' is oriented substantially orthogonally an output axis A of the example power-driven tool 100' (corresponding to an input axis of the example accessory tool 110'). FIGS. 1D-1I illustrate an example in which the example accessory tool 110' is coupled to the example power-driven tool 100' such that the output axis B of the example accessory tool 110' is oriented substantially in parallel with the output axis A of the example power-driven tool 100' (and corresponding input axis of the example accessory tool 110'). In some situations, orientation of the output axis B of the example accessory tool 110' substantially in parallel with the output axis of the power-driven tool 100' may facilitate use of the accessory tool 110' and enhance user ergonomics. For example, in a situation in which one of the nut runner accessory tools described herein is coupled to the example power-driven tool 100' in this manner, alignment of the output axis B of the example accessory tool 110' substantially in parallel with the output axis A of the example power-driven tool 100' may cause the power-driven tool 100' (i.e., held by the user) to move in the direction of a nut being threaded onto a rod, providing a more ergonomic user experience in this particular example.

Features of the example power-driven tool 100' and the example brace assembly 130' shown in FIGS. 1D-1I are substantially similar to the features described above, and thus further duplicative detailed description thereof will be omitted.

In some examples, the brace assembly 130' may include an adjustment device 150'. User manipulation of the adjustment device 150' may provide for adjustment of an orientation, for example, a radial orientation, of the accessory tool 110' relative to the power-driven tool 100'. In particular, user manipulation of the adjustment device 150' may provide for adjustment of a radial position of a working portion of the accessory tool 110'. Various example radial orientations of the example accessory tool 110' with respect to the example power-driven tool 100' are shown in FIGS. 1F-1I. The examples shown in FIGS. 1F-1I are presented in a coupling of the example accessory tool 110' to the example power-driven tool 100' in which the output axis B of the example accessory tool 110' is oriented substantially in parallel with the output axis A of the example power-driven tool 100', simply for purposes of discussion and illustration. The principles described with respect to the adjustment of the radial orientation of the example accessory tool 110' may be similarly applied to an arrangement in which the output axis B of the example accessory tool 110' is oriented substantially orthogonally to the output axis A of the example power-driven tool 100'. Radial adjustment of the mounting position of the example accessory tool 110' in this manner may facilitate user access to workpieces in differing installation environments, access environments, and the like.

Figure 2B:
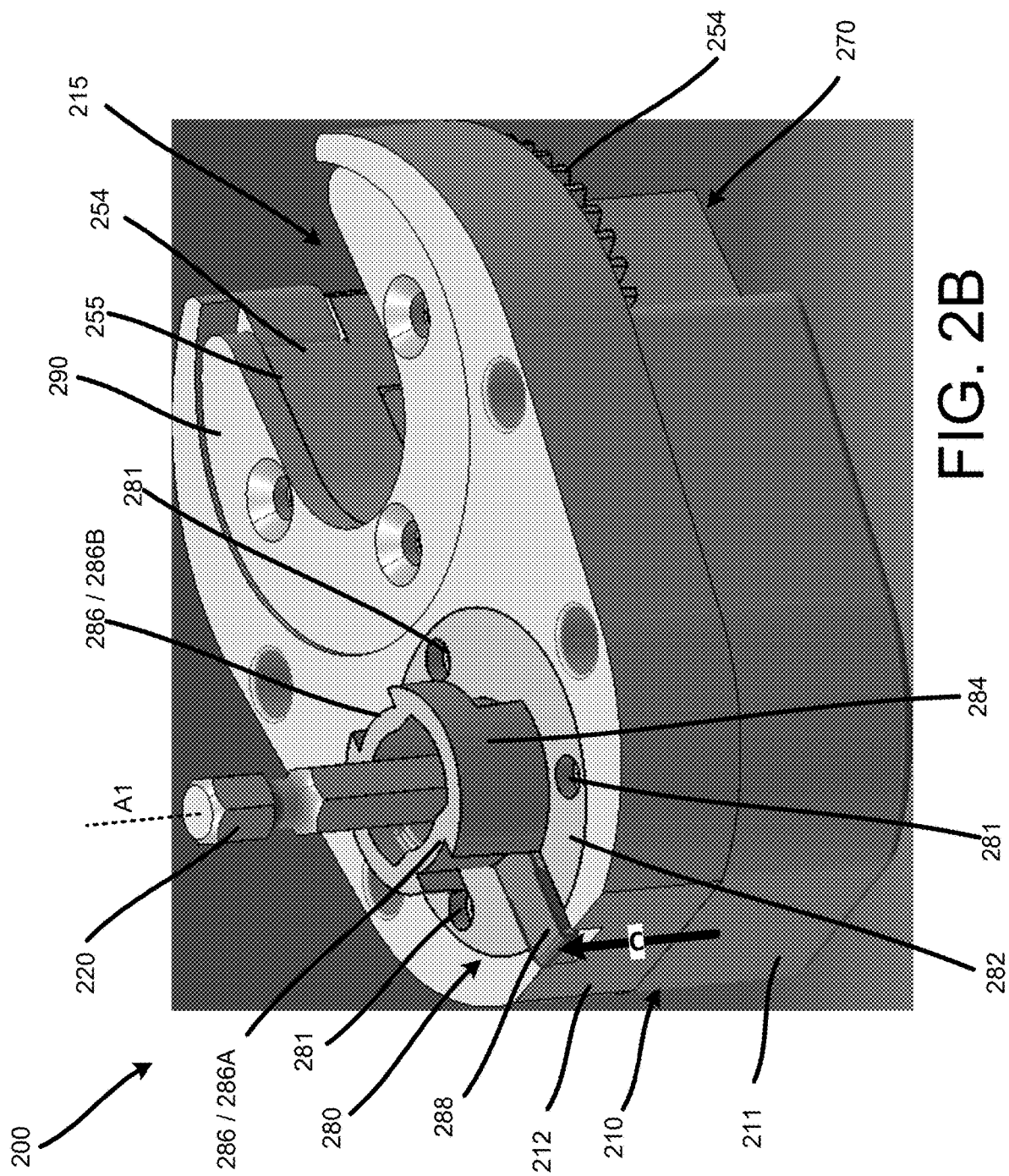
FIG. 2B is a bottom perspective view of the example nut runner accessory shown in FIGS. 2A(1) and 2A(2).
Figure 2C:
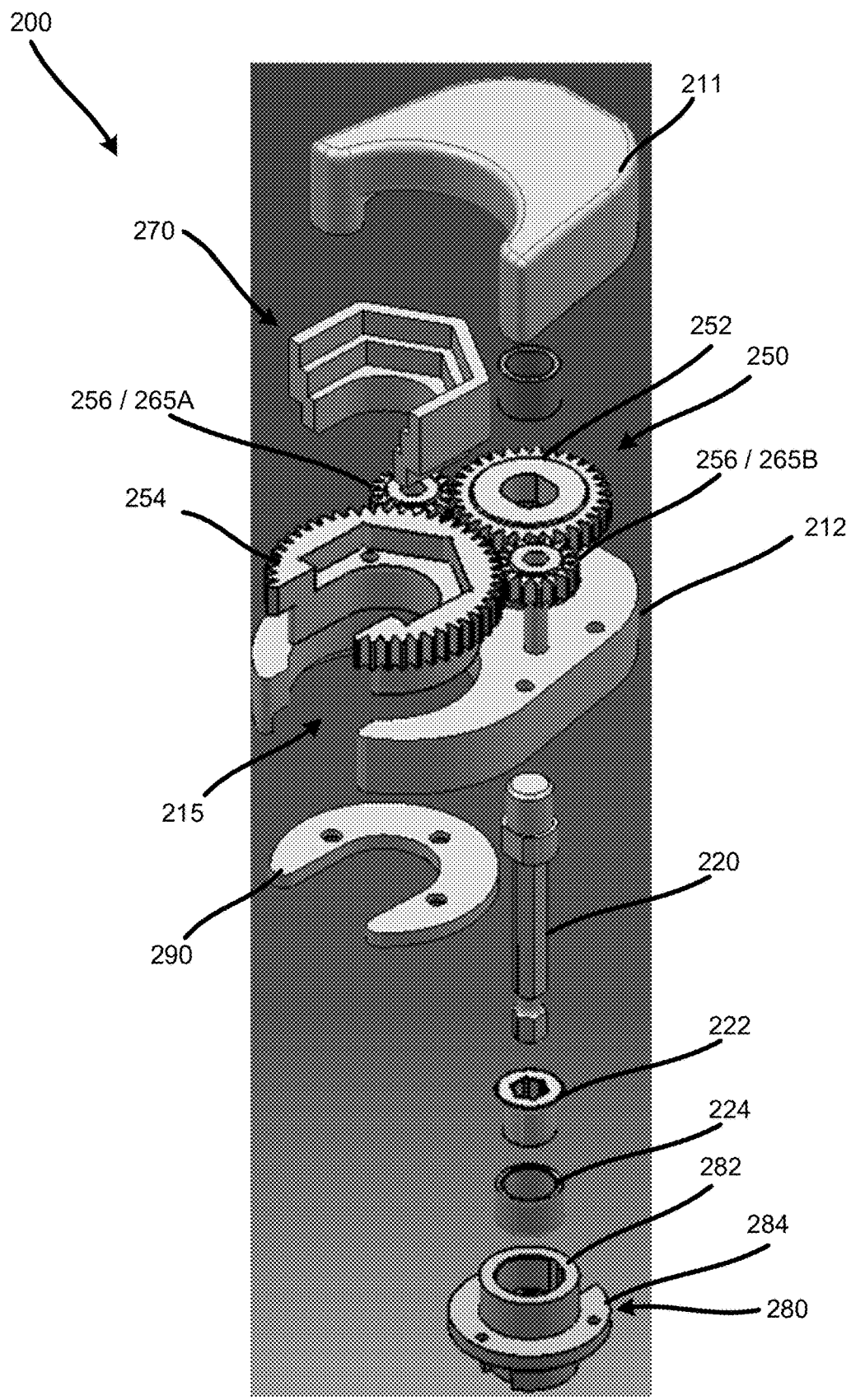
FIG. 2C is an exploded perspective view of the example nut runner accessory shown in FIGS. 2A and 2B, in accordance with implementations described herein.
Figure 2D:
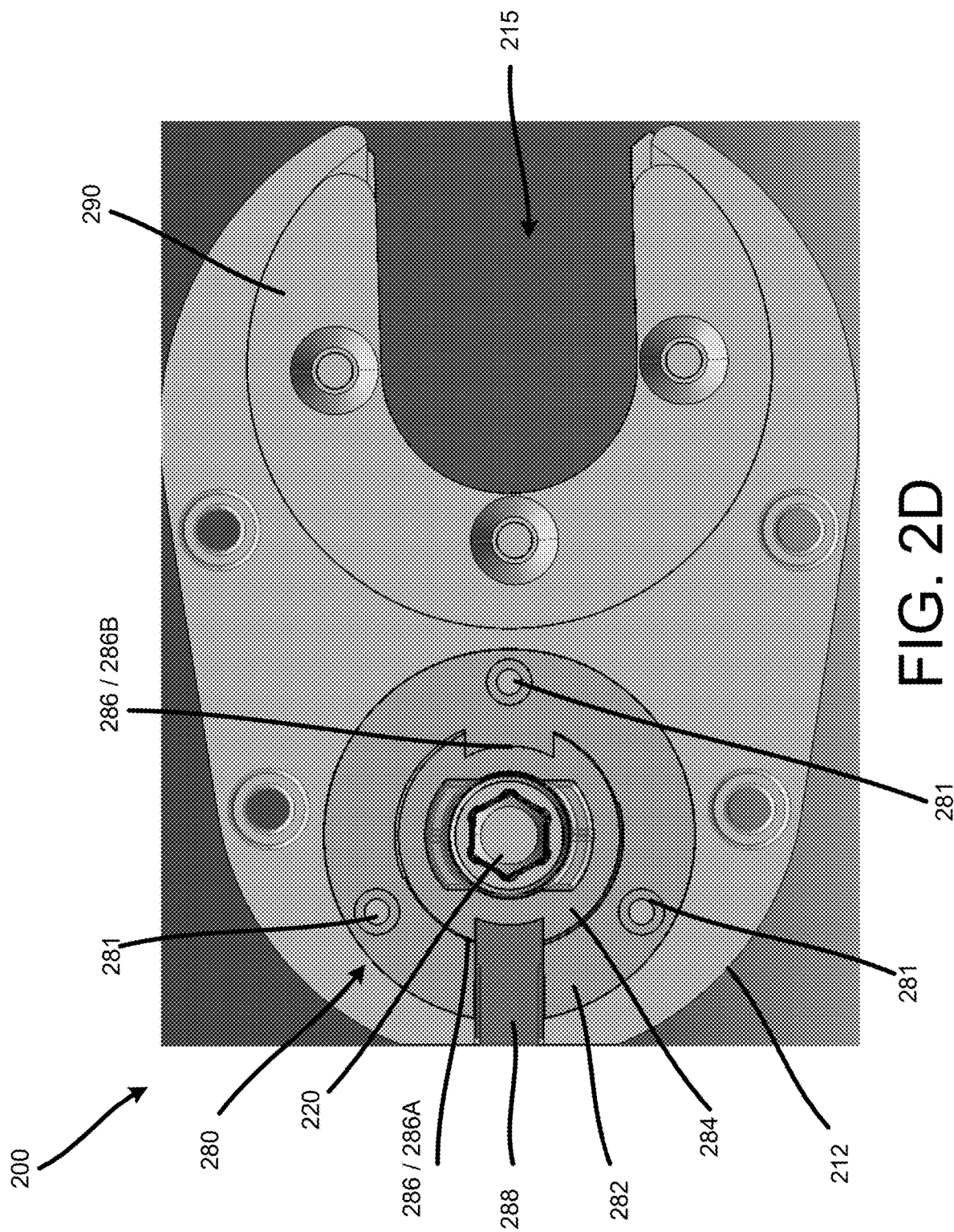
FIG. 2D is a bottom view of the example nut runner accessory shown in FIGS. 2A-2C, in accordance with implementations described herein.

FIG. 2A, including FIGS. 2A(1) and 2A(2), provides a first assembled perspective views, and FIG. 2B is a second assembled perspective view, of an example nut runner accessory 200, in accordance with implementations described herein. FIG. 2C is an exploded perspective view of the example nut runner accessory 200. FIG. 2D is a plan view (for example, a bottom plan view in the example orientation shown in FIG. 2A) of the example nut runner accessory 200. FIG. 2E, including FIGS. 2E(1) and 2E(2), provides an example gear assembly 250 received in an example housing 210 of the example nut runner accessory 200, with a portion of the housing 210 removed so that a relative arrangement of gears of the example gear assembly 250 is visible. The example nut runner accessory 200 can be coupled to a power-driven tool such as the example power-driven tool 100 and/or the example power-driven tool 100' shown in FIGS. 1A-1I, to perform an operation on a workpiece, i.e., to move a nut along a threaded rod.

The example nut runner accessory 200 shown in FIGS. 2A-2E includes a housing 210 having a first housing portion 211 and a second housing portion 212. The example housing 210 (including the example first housing portion 211 and second housing portion 212) include a C-shaped contour, allowing the housing 210 to be positioned relative to an outer circumferential surface of a threaded rod, for the threading of a nut on the threaded rod. In some examples, the housing 210 includes an extension portion (similar to the extension 112' shown in FIG. 1C and/or FIG. 1E; not shown in FIGS. 2A-2E) that may facilitate the coupling of the nut runner accessory 200 to a brace assembly (not shown in FIGS. 2A-2E). A gear assembly 250 is housed in the housing 210. An input shaft 220 has a first end portion thereof fixed to the gear assembly 250. A second end portion of the input shaft 220 is configured to be coupled to the output assembly of an external source such as the example power-driven tool 100, or the example power-driven tool 100', or another power-driven tool not explicitly shown herein, via, for example, the chuck assembly 170/170' of the power-driven tool 100/100'. With the input shaft 220 coupled to the power-driven tool 100/100' via the chuck assembly 170/170', a force generated by the motor of the power-driven tool 100/100' can be transmitted to the nut runner accessory 200 so that an operation can be carried out on a workpiece.

As shown in FIGS. 2C and 2E, the example gear assembly 250 includes an input gear 252 coupled to an output gear 254 by a pair of idler gears 256 (256A, 256B). The example output gear 254 has a C-shaped configuration, corresponding to the C-shaped contour of the housing 210, allowing the output gear 254 to be positioned relative to the outer circumferential surface of the threaded rod, for the threading of a nut on the threaded rod. The input shaft 220 may be coupled, for example, fixedly coupled to the input gear 252. This causes the input gear 252 to rotate together with the input shaft 220 in response to a force received from an external source, for example, generated by the motor of the power-driven tool 100/100' in a coupled state of the nut runner accessory 200 and the power-driven tool 100/100'. For example, as shown in FIG. 2E (1), the input gear 252 may rotate in a first rotational direction R1 in response to a first rotational force transmitted thereto from the motor of the power-driven tool 100/100' (for example, in a first operation mode of the tool 100/100' that generates a rotational force in the first rotational direction R1). In response to rotation of the input gear 252 in the first rotational direction R1, the idler gears 256 (256A, 256B), which are in meshed engagement with the input gear 252, rotate in a second rotational direction R2 (opposite the first rotational direction R1). In response to rotation of the idler gears 256 (256A, 256B) in the second rotational direction R2, the output gear 254, which is in meshed engagement with the idler gears 256 (256A, 256B), rotates in the first rotational direction R1. Similarly, as shown in FIG. 2E (2), the input gear 252 may rotate in the rotational direction R2 in response to a second rotational force transmitted thereto from the motor of the power-driven tool 100/100' (for example, in a second operation mode of the tool 100/100' that generates a rotational force in the first rotational direction R2). In response to rotation of the input gear 252 in the second rotational direction R2, the idler gears 256 (256A, 256B) rotate in the first rotational direction R1, and the output gear 254 rotates in the second rotational direction R2. In some implementations, the first and second modes of operation of the example power-driven tool 100 may correspond to operation of the motor of the power-driven tool 100 in a forward direction and a reverse direction.

In the example arrangement of gears 252, 254, 256 of the example gear assembly 250 shown in FIGS. 2A-2E, a diameter of each of the idler gears 256 is less than a diameter of the input gear 252, and a diameter of the output gear 254 is larger than the diameter of the input gear 252, simply for purposes of discussion and illustration. The input gear 252, the output gear 254, and the idler gears 256 may have other relative sizes and/or combinations of sizes. For example, in some implementations, a diameter of the output gear 254 may be substantially the same as a diameter of the input gear 252, resulting in an approximately 1:1 gear ratio. In the example arrangement shown in FIGS. 2A-2E, the larger diameter of the output gear 254 as compared to the smaller diameter of the input gear 252 causes the output gear 254 to rotate at a slower rotational speed than the input gear 252. Thus, the arrangement shown in FIGS. 2A-2E presents an example in which a rotational speed of the output gear 254 is reduced compared to the rotational speed of the input gear 252. In some situations, for example in a situation in which an output speed of the power-driven tool 100/100' is relatively high, this type of output speed reduction may be beneficial. For example, operation of the nut runner accessory 200 above an output speed of the power-driven tool 100/100' in the form of a drill driver (i.e., an arrangement in which a gear ratio is less than 1.0) may result in inconsistent engagement of the nut runner accessory 200 with a nut to be threaded onto/off of a threaded rod, unstable operation of the nut runner accessory 200, and the like. The relative sizes and arrangement of the example gears 252, 254, 256 of the example gear assembly 250 shown in FIGS. 2C and 2E are provided for purposes of discussion and illustration. A gear ratio associated with the example gear assembly 250 can be adjusted by adjusting the relative sizes or number of teeth of the example gears 252, 254, 256 to, for example, further reduce a rotational speed of the output gear 254 relative to the input gear 252, or to increase a rotational speed of the output gear 254 relative to the input gear 252, and the like.

In the example arrangement shown in FIGS. 2C and 2E, the example gear assembly 250 includes two idler gears 256A, 256B in meshed engagement between the input gear 252 and the output gear 254. In this manner, at least one of the two idler gears 256A, 256B will remain in meshed engagement between the input gear 252 and the output gear 254 as the output gear 254 rotates relative to the idler gears 256A, 256B. For example, as the C-shaped output gear 254 rotates, and the open portion of the C-shaped output gear 254 rotates past the first idler gear 256A, the second idler gear 256B maintains its meshed engagement with the output gear 254, so that the output gear 254 continues to be driven. Similarly, as the output gear 254 rotates, and the open portion of the C-shaped output gear 254 rotates past the second idler gear 256B, the first idler gear 256A maintains its meshed engagement with the output gear 254, so that the output gear 254 continues to be driven.

As shown in FIGS. 2A and 2C, a driver head 270 may be fixed to the output gear 254, to rotate together with the output gear 254 relative to the housing 210. The output gear 254, and driver head 270 fixed thereto, may be retained relative to the housing 210 by a plate 290. The plate 290 may be fixed to a bottom surface 255 of the output gear 254 such that the plate 290 rotates together with the output gear 254 and the driver head 270, while alignment of the output gear 254 (and driver head 270 fixed thereto) is maintained relative to the housing 210, but is allowed to rotate.

In the example shown in FIGS. 2A(1) and 2A(2), the example driver head 270 is a separate component from the output gear 254, with a base 279 of the driver head 270 received in a corresponding receptacle 259 defined in the output gear 254. The driver head 270 may be fixed to the output gear 254 by, for example, press-fitting, adhesive, and other fastening methods. In other implementations, the driver head 270 may be integrally formed with the output gear 254. In yet other implementations, the driver head 270 may be removably coupled with the output gear 254, e.g., by slip fit, friction fit, and/or a ball detent and recess. The driver head 270 has a C-shaped contour, corresponding to the C-shaped contour of the housing 210, the C-shaped contour of the plate 290, and the C-shaped contour of the output gear 254. The C-shaped contour of the housing 210 (including the first housing portion 211 and the second housing portion 212), the plate 290, the output gear 254 and the driver head 270 together define a U-shaped slot 215 of the nut runner accessory 200. The U-shaped slot 215 may allow the nut runner accessory 200 to be positioned around, i.e., partially surrounding, a threaded rod and a nut to be threaded onto/off of the threaded rod.

The example driver head 270 shown in FIGS. 2A and 2C is a multi-sized driver head 270 that can engage multiple different sizes/configurations of nuts. In particular, the example driver head 270 shown in FIGS. 2A and 2C is a multi-size hexagonal driver head including two sets of stepped pockets 271 and 272 extending upward from the base 279, each facing the open end portion of the U-shaped slot 215, and each configured to engage a different size of hexagonal nut. Each pocket may extend around an entirety of a circumference of the central opening or may form only a portion of the circumference about the central opening (e.g., three or four side walls of a six-sided hex-shape).

The first stepped pocket 271 is defined by four side walls 273 and a base wall 275. The four side walls 273 are arranged to define four sides of a hexagonal shape having a first cross-sectional width. The base wall 275 defines an area on which a corresponding surface of a first nut having a first diameter is to be seated, with four sides of the first nut engaging the four side walls 273 of the first stepped pocket 271, such that the first nut can be engaged in the first stepped pocket 271. Similarly, the second stepped pocket 272 is defined by four side walls 274 and a base wall 276. The four side walls 274 are arranged to define four sides of a hexagonal shape having a second cross-sectional width. The base wall 276 defines an area on which a corresponding surface of a second nut is to be seated, with four sides of the second nut engaging the four side walls 274 of the second stepped pocket 272, such that the second nut can be engaged in the second stepped pocket 272.

Due to the stepped nature of the first stepped pocket 271 and the second stepped pocket 272, the first cross-sectional width of the first stepped pocket 271 is greater than the second cross-sectional width of the second stepped pocket 272. In this manner, the first stepped pocket 271 is configured to engage the first nut having a larger size or dimension (i.e., larger diameter) than the nut to be engaged by the second stepped pocket 272. The steps defined by the relative positioning of the base walls 275, 276 of the first and second stepped pockets 271, 272 seat and retain the respective nut in the appropriate stepped pocket 271, 272 for the size of the nut. Thus, the example multi-sized driver head 270 shown in FIGS. 2A and 2C including the first and second stepped pockets 271, 272 is configured to selectively receive and engage nuts having different sizes/cross-sectional widths for threading onto/off of a threaded rod by the nut runner accessory 200. The ability to receive and engage nuts having different size(s) and/or cross-sectional diameters in this manner enhances the utility and functionality of the nut runner accessory 200 and the power-driven tool 100/100' to which the nut runner accessory 200 is coupled.

The driver head 270 shown in FIGS. 2A and 2C is a hexagonal driver head 270 including two stepped pockets 271, 272 configured to engage two different sized nuts, simply for purposes of discussion and illustration. In some implementations, the driver head may include more, or fewer, stepped pockets. In some implementations, the stepped pockets may have configurations other than the four side walled configuration shown. For example, one or more of the stepped pockets can include more, or fewer walls, may be splined and/or have a starred contour, and the like. In addition, the driver head could have one or more pockets that have an adjustable diameter or width, e.g., using an adjustment mechanism similar to an adjustable head hand wrench.

As noted above, the example nut runner accessory 200 may be driven by a power-driven tool, such as the example power-driven tool 100 and/or the example power-driven tool 100' described above. In some examples, an end portion of the input shaft 220 can be coupled to the output assembly of the power-driven tool 100/100' via the chuck assembly 170/170', allowing a force generated by the motor of the tool 100/100' to be transmitted to the gear assembly 250 of the nut runner accessory 200. In some examples, an engagement structure 280 (see FIGS. 2B-2D) may be provided on the housing 210 of the nut runner accessory 200, surrounding the input shaft 220. The engagement structure 280 may engage a corresponding coupling device provided on the power-driven tool 100/100' and/or on an extension device coupled to the power-driven tool 100/100'. For example, in some implementations, L-shaped slots 286A, 286B formed on opposite sides of the engagement structure 280 may be configured to slidably engage corresponding protrusions defined on a coupling device and/or an extension device and/or a holding device provided on or coupled to the power-driven tool 100/100' to provide for axial, non-rotatable coupling therebetween. Engagement of the engagement structure 280 in this manner is described in U.S. patent application Ser. No. 16/858,896, which is incorporated herein by reference in its entirety.

In the example arrangement shown in FIGS. 2B and 2C, the engagement structure 280 includes a flange portion 282 extending outward, for example radially outward, from a cylindrical coupling member 284. Fasteners 281 may extend through the flange portion 282 and into the housing 210, to couple the cylindrical coupling member 284 to the housing 210. In the example shown in FIG. 2B, a first L-shaped slot 286A and a second L-shaped slot 286B are formed on a first end portion of the cylindrical coupling member 284 that is configured to engage or mate with a corresponding engagement structure or coupling device on the power-driven tool 100 and/or an extension device coupled thereto. A second end portion of the cylindrical coupling member 284 engages a coupling nut 222 and sleeve 224 surrounding a central portion of the input shaft 220, to fix the input shaft 220 to the engagement structure 280. A radially extending tab 288 is biased in the direction of the arrow C by, for example a leaf spring (not shown). With the complimentary slots and protrusions of the engagement structure 280 and the corresponding coupling device/engagement structure of the tool 100/100' engaged, the tab 288 may be biased into a corresponding recess in the mated coupling device/engagement structure. The biasing of the tab 288 into the recess of the mating coupling device/engagement structure may in turn retain the position of the protrusions of the mated coupling device/engagement structure in the L-shaped slots 286A, 286B, thus maintaining an axially aligned, non-rotatably coupling between the engagement structure 280 and the mated coupling device/engagement structure.

In use, a threaded rod can be received, or positioned in the U-shaped slot 215, and a nut engaged into one of the two example stepped pockets 271, 272 defined in the driver head 270 of the example nut runner accessory 200. With the input shaft 220 coupled to the output assembly of the power-driven tool 100/100', the input shaft 220 rotates in response to the force generated by the motor of the power-driven tool 100/100'. This causes the output gear 254 and the driver head 270 to rotate, thus threading the nut along the threaded rod. A force of the motor in a first rotational direction causes corresponding rotation of the driver head 270 and the nut in the first rotational direction, and movement of the nut along the threaded rod in a first axial direction. Similarly, a force of the motor in a second rotational direction causes corresponding rotation of the driver head 270 and the nut in the second rotational direction, and movement of the nut along the threaded rod in a second axial direction. The U-shaped slot 215 allows the nut runner accessory 200 to move along the axial length of the threaded rod as the nut is driven in this manner, allowing the nut to be driven along threaded rods of varying lengths.

In some situations, depending on a configuration of the driver head, the stepped pockets, installation position with respect to the housing, rotation speed and the like, operation of the nut runner accessory may be affected by a relative position of a center of rotation of the driver head and a center of mass of the driver head. That is, in some situations, an offset between the center of rotation of the driver head and the center of mass of the driver head may produce vibration during operation, and may result in inconsistent engagement and/or disengagement of the driver head with a nut to be threaded onto/off of a threaded rod. Accordingly, in some implementations, a nut runner accessory, in accordance with implementations described herein, may include counterweighting features. Counterweighting features may counteract imbalance generated during operation due to an offset between the center of rotation and the center of mass of the driver head, thus improving engagement with the nut to be threaded onto/off of the threaded rod, and enhancing functionality and utility of the nut runner accessory and power-driven tool to which it is coupled.

Figure 3A:
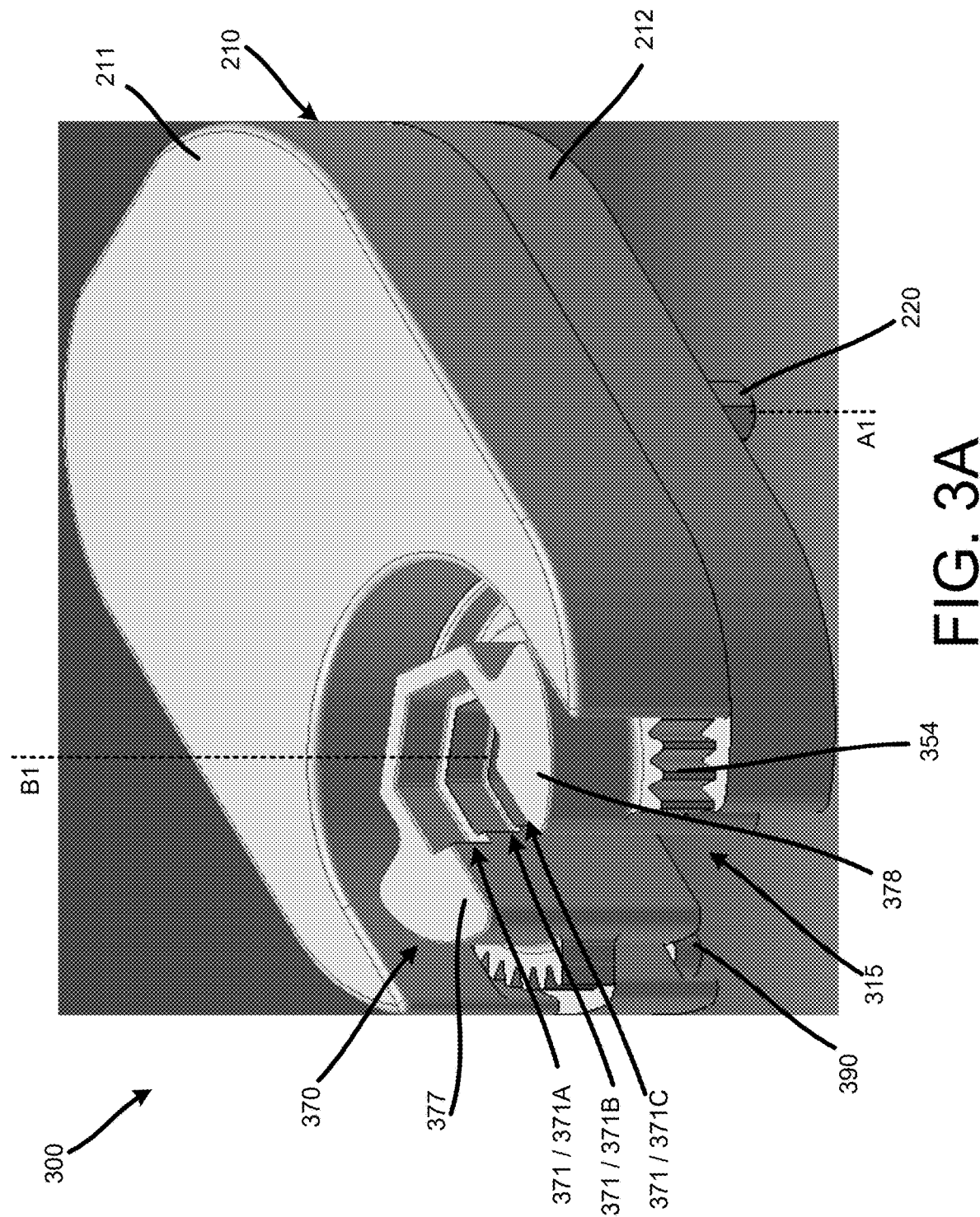
FIG. 3A is an assembled perspective view of a nut runner accessory, in accordance with implementations described herein.
Figure 3B:
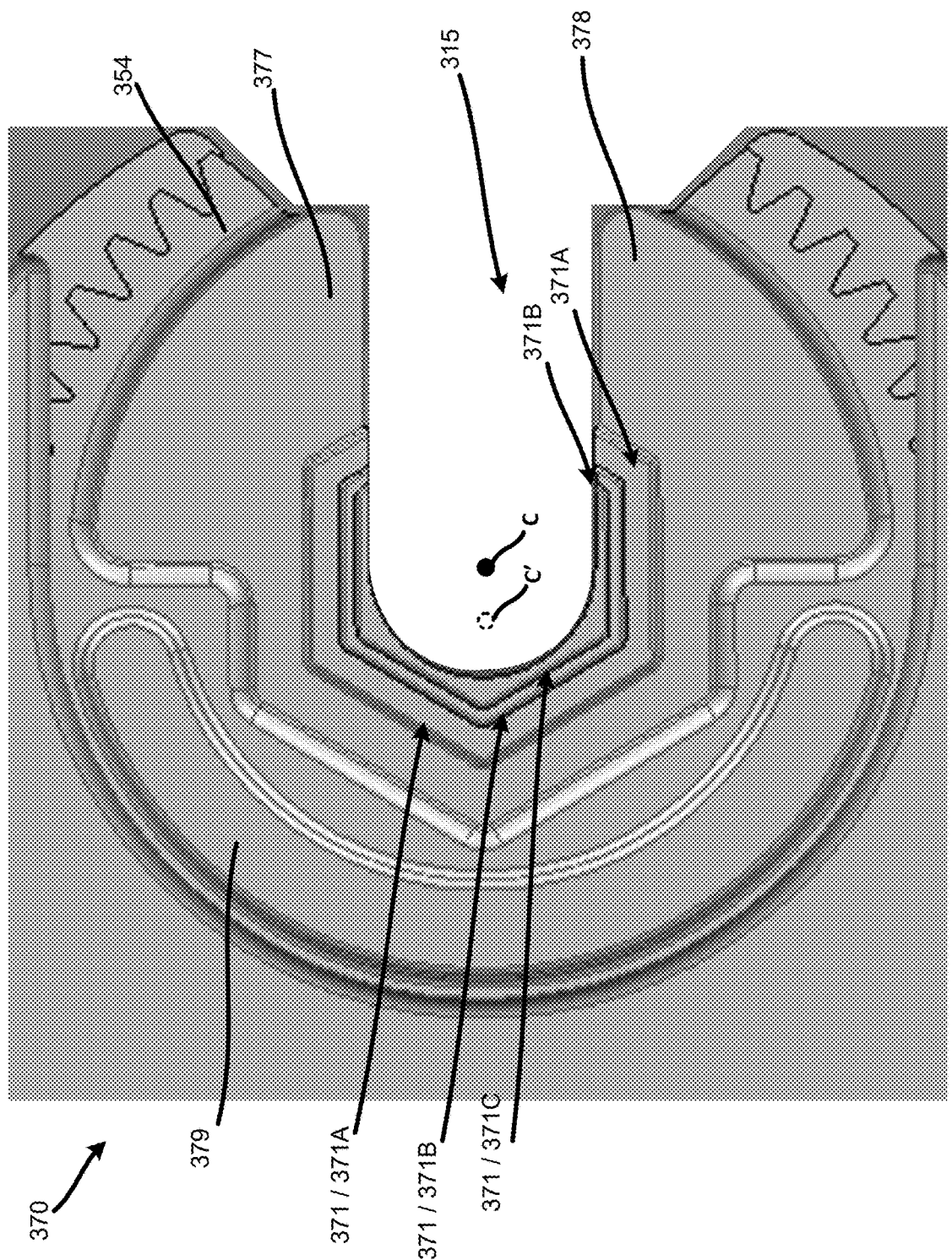
FIG. 3B is a top plan view of the example nut runner accessory shown in FIG. 3A.
Figure 3C:
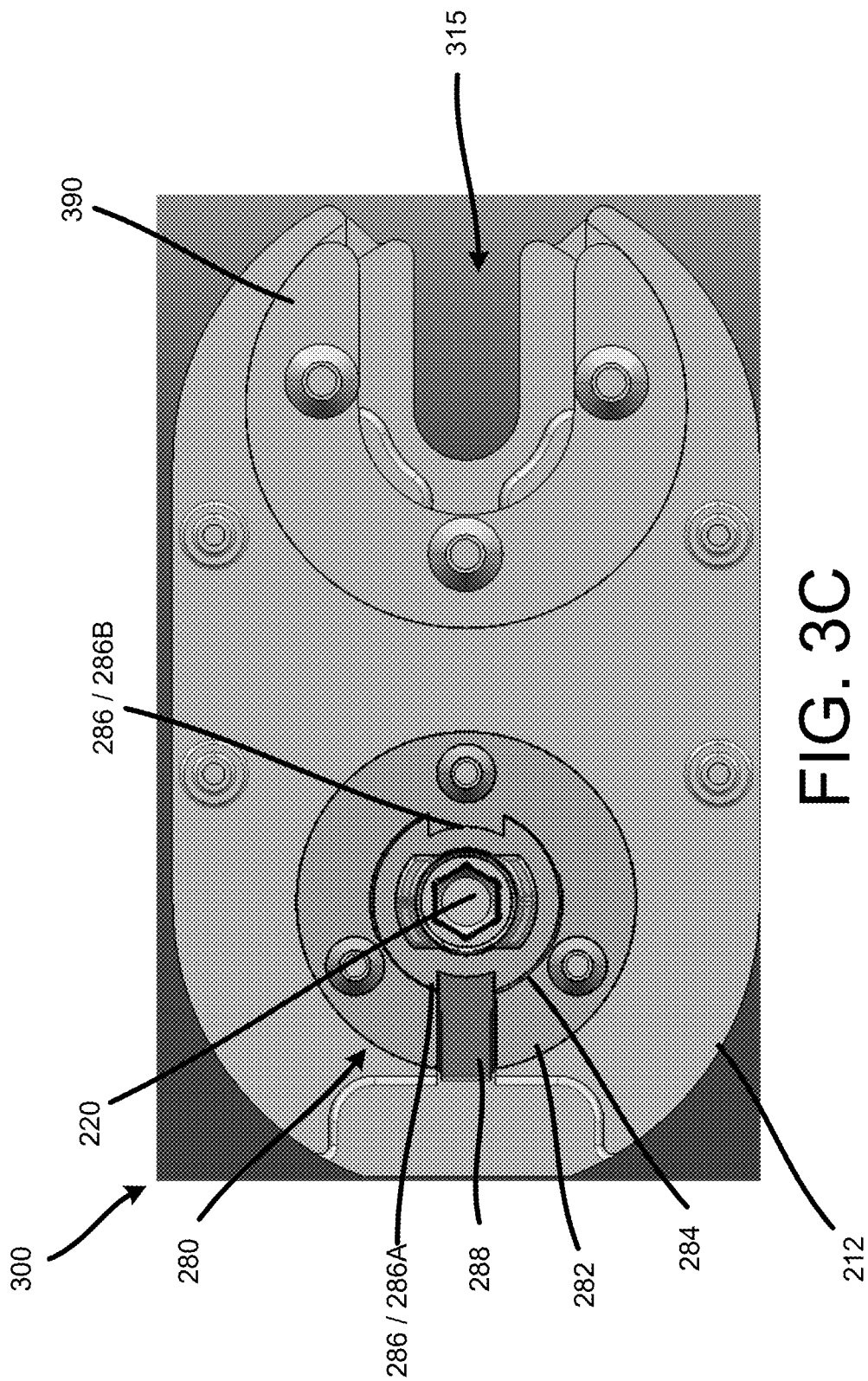
FIG. 3C is a bottom plan view of the example nut runner accessory shown in FIG. 3A.
Figure 3D:
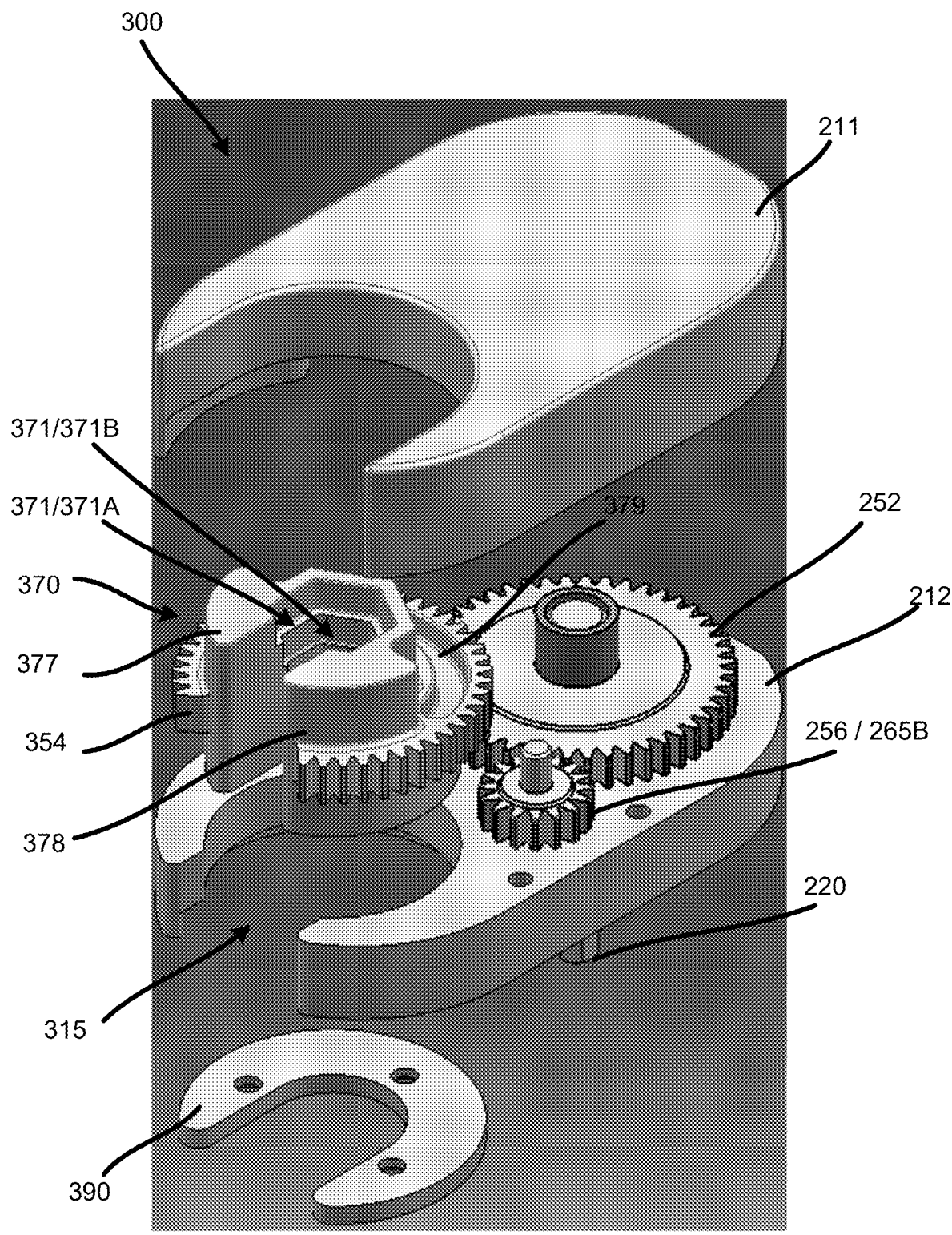
FIG. 3D and FIG. 3E are exploded perspective views of the example nut runner accessory shown in FIGS. 3A-3C.
Figure 3E:
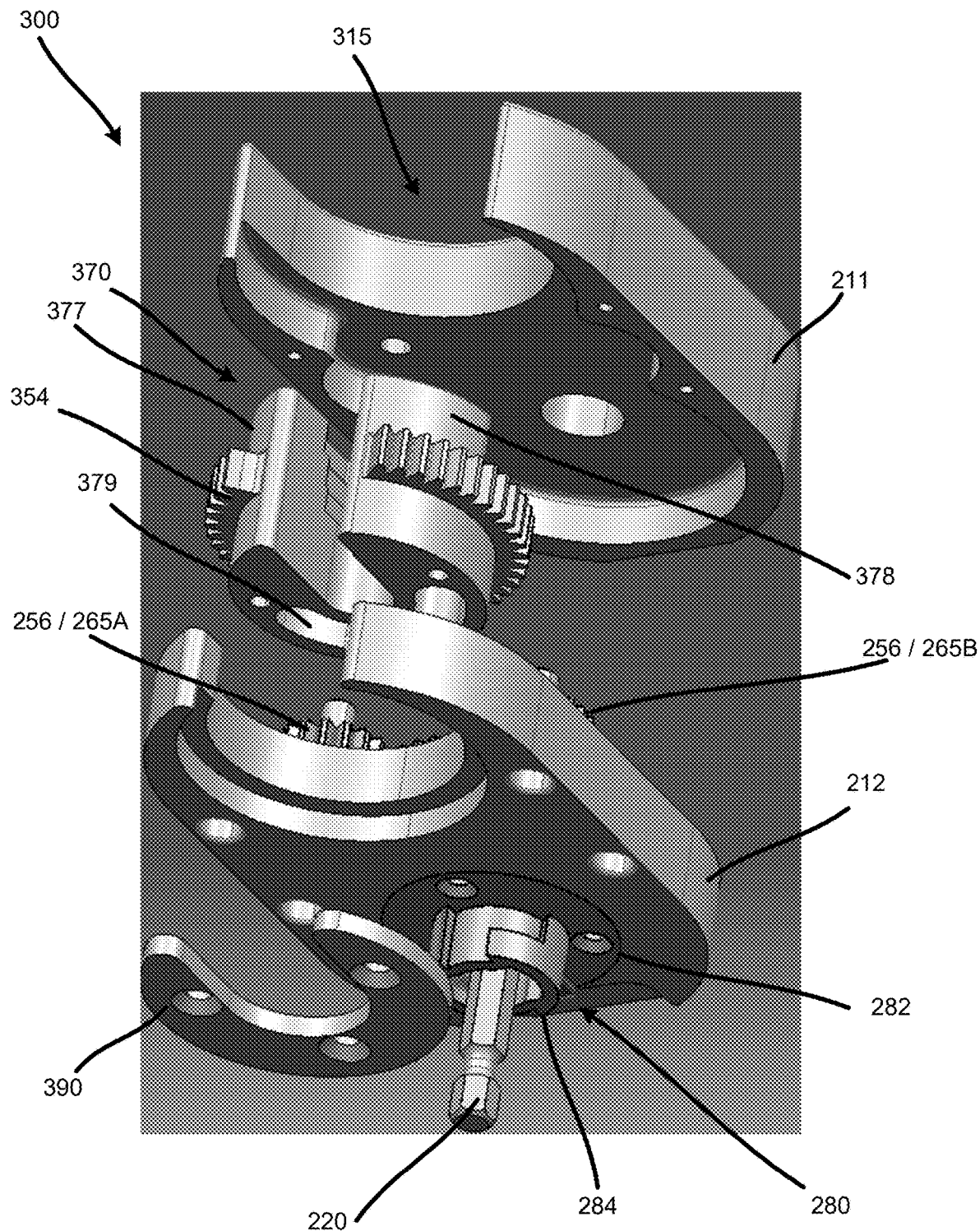

FIG. 3A is a top assembled perspective view of a nut runner accessory 300, in accordance with implementations described herein. FIG. 3B is a top plan view, and FIG. 3C is a bottom plan view of the example nut runner accessory 300 shown in FIG. 3A. FIG. 3D is a partially exploded top perspective view, and FIG. 3E is a partially exploded bottom perspective view, of the example nut runner accessory 300 shown in FIGS. 3A-3C.

The example nut runner accessory 300 shown in FIGS. 3A-3E includes the housing 210 as described above having the first and second housing portions 211, 212. The example nut runner accessory 300 includes the input shaft 220 configured to be coupled between the input gear 252 and the output assembly of the power-driven tool 100/100', as described above with respect to the example nut runner accessory 200 shown in FIGS. 2A-2E. The example nut runner accessory 300 shown in FIG. 3A includes a counterweighted driver head 370 including one or more counterweight features 377, 378, 379. In the example shown in FIGS. 3A-3E, the counterweighted driver head 370 includes a first counterweight feature 377, in the form of a mass provided at a first end portion of a plurality of stepped pockets 371 formed in the driver head 370, and a second counterweight feature 378 in the form of a mass at a second end portion of the plurality of stepped pockets 371. The example driver head 370 includes a third counterweight feature 379 in the form of a recess, or a removal of mass, at a periphery of the plurality of stepped pockets 371. The one or more counterweight features 377, 378, 379 may counteract imbalance generated during operation, to maintain engagement of a nut in one of the plurality of stepped pockets 371. That is, without the one or more counterweight features 377, 378, 379, a center of mass may be positioned at a point C', somewhat offset from a center of rotation of the driver head 370 positioned at a point C, as shown in FIG. 3B. In contrast, in the example nut runner accessory 300 including the example one or more counterweight features 377, 378, 379 the center of mass and the center of rotation of the counterweighted driver head 370 may coincide or approximately coincide, or be aligned or approximately aligned at the point C shown in FIG. 3B.

In the example implementation shown in FIGS. 3A-3E, the counterweighted driver head 370 is formed integrally with an output gear 354 that is driven by the input gear 252 via the idler gears 256. In this configuration, the third counterweight feature 379 may be formed as a recess defined along a periphery of the plurality of stepped pockets 371, in a surface portion of the output gear 354. In some examples, the counterweighted driver head 370 may be formed separately from, and coupled to, the output gear 354. Counterweighting of the driver head 370 may provide for stable engagement of the driver head 370 with a nut to be threaded onto a threaded rod, and may provide for consistent operation of the example nut runner accessory 300 driven by the example power-driven tool 100.

As shown in FIGS. 3A-3E, the example counterweighted driver head 370 can engage multiple different sizes/configurations of nuts. In particular, the example counterweighted driver head 370 shown in FIGS. 3A and 3D is a multi-size hexagonal driver head including three sets of stepped pockets 371A, 371B, 371C, each configured to engage a different size of hexagonal nut. In this example arrangement, each of the plurality of stepped pockets 371 is defined by four side walls and a base wall. The four side walls are arranged to define four sides of a hexagonal shape having a cross-sectional width corresponding to a nut to be engaged by the corresponding stepped pocket 371, and the base wall defines an area on which a corresponding surface of the nut is to be seated. The stepped nature of the plurality of stepped pockets 371 (i.e., a first stepped pocket 371A, a second stepped pocket 371B, and a third stepped 371C in this example arrangement) having different cross-sectional widths allow the counterweighted driver head 370 to selectively receive and engage nuts having different sizes/cross-sectional widths for threading onto/off of a threaded rod by the nut runner accessory 300. The counterweighted driver head 370 shown in FIGS. 3A and 3D is a hexagonal driver head 370 including three stepped pockets 371A, 371B, 371C configured to engage a corresponding three different sized nuts, simply for purposes of discussion and illustration. In some implementations, the counterweighted driver head 370 may include more, or fewer, stepped pockets, having the same or different configurations other than the four side walled configuration shown, including more, or fewer walls, splined surfaces, a starred contour, and the like.

The example counterweighted driver head 370 has a C-shaped contour, corresponding to a C-shaped contour of the output gear 354 and a C-shaped contour of a plate 390 that is fixed to the output gear 354, and that is configured to rotate together with the output gear 354 and counterweighted driver head 370 while retaining the output gear 354 and counterweighted driver head 370 rotatably coupled to the housing 210. The aligned C-shaped contour of the counterweighted driver head 370, the output gear 354 and the plate 390 define a U-shaped slot 315 of the nut runner accessory 300. The U-shaped slot 315 may allow for the nut runner accessory 300 to be positioned around, i.e., partially surrounding, a threaded rod and a nut to be threaded onto/off of the threaded rod. Counterweighting provided by the one or more counterweight features 377, 378, 379 may reduce vibration and/or provide for stable engagement between the counterweighted driver head 370 and the nut during operation of the nut runner accessory 300, thus improving utility and functionality of the nut runner accessory 300 and the power-driven tool by which it is driven.

In the example nut runner accessory 200 described above with respect to FIGS. 2A-2E, and the example nut runner accessory 300 described above with respect to FIGS. 3A-3E, a rotational axis A1, or input axis of operation A1 at the input shaft 220 of the nut runner accessory 200, 300 is substantially aligned with, or arranged substantially in parallel to an output axis of operation B1 at the driver head 270, 370 of the nut runner accessory 200, 300. The positioning of the input axis of operation A1 results in a first orientation of the example nut runner accessory 200, 300 relative to the power-driven tool 100/100'. In some examples, a nut runner accessory, in accordance with implementations described herein, may be configured so that the input axis of operation is arranged at an angle with respect to the output axis of operation.

Figure 4A:
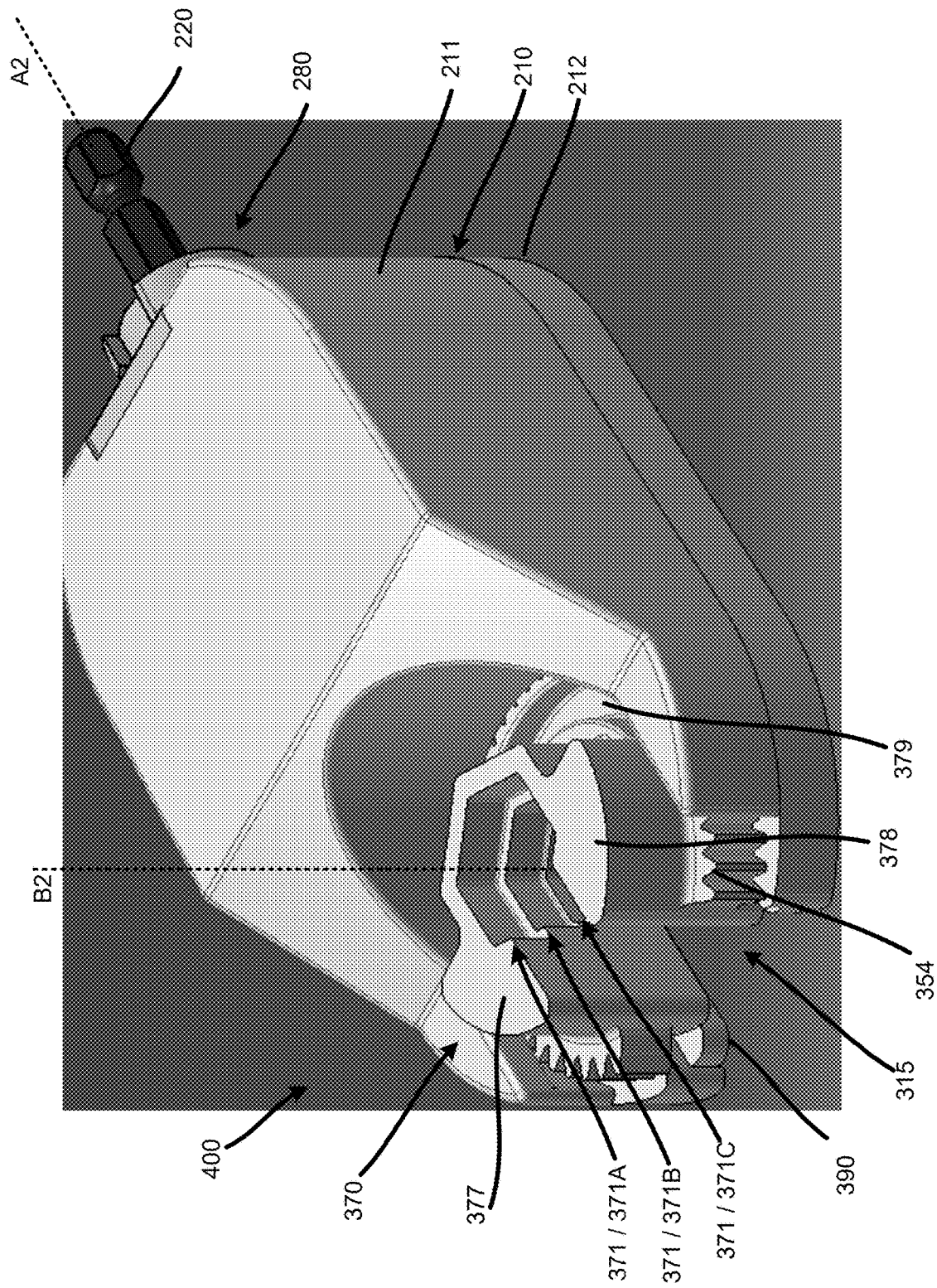
FIG. 4A is an assembled perspective view of an example nut runner accessory, in accordance with implementations described herein.
Figure 4B:
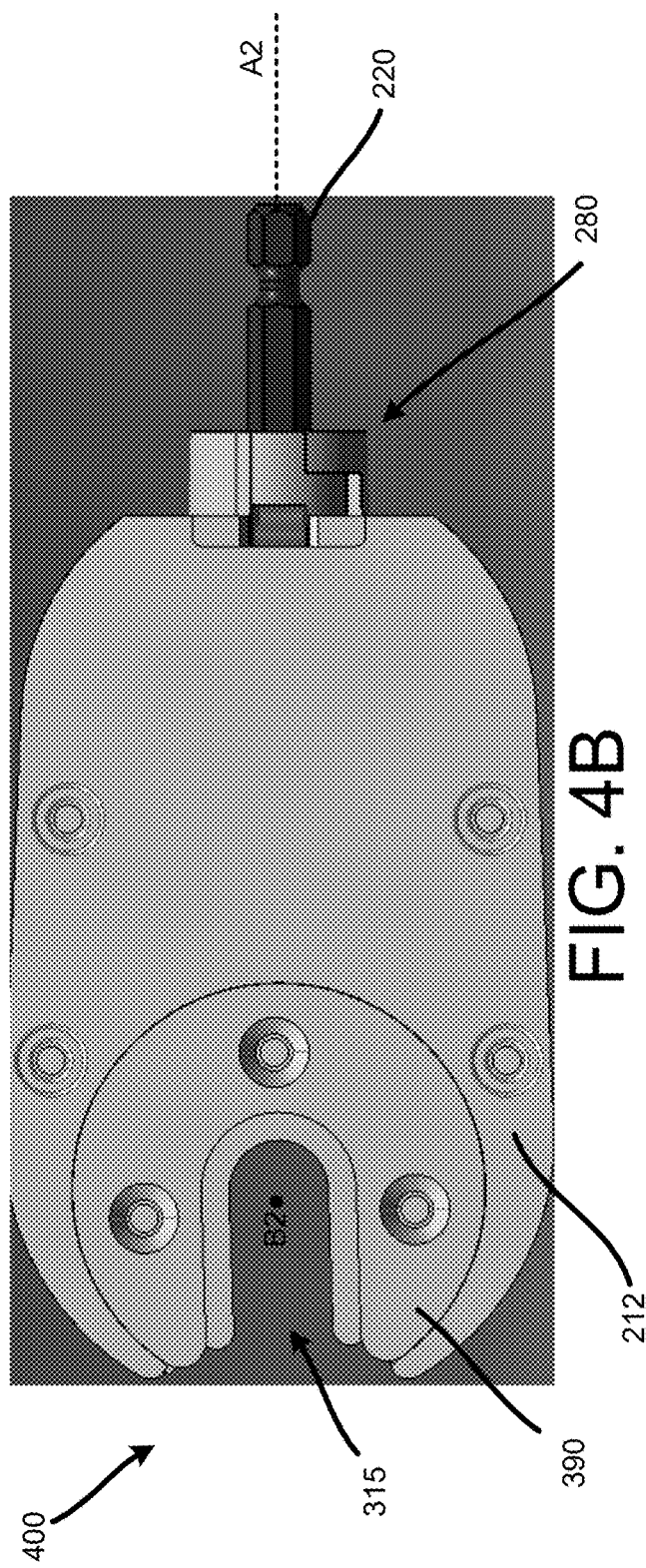
FIG. 4B is a bottom plan view of the example nut runner accessory shown in FIG. 4A.
Figure 4C:
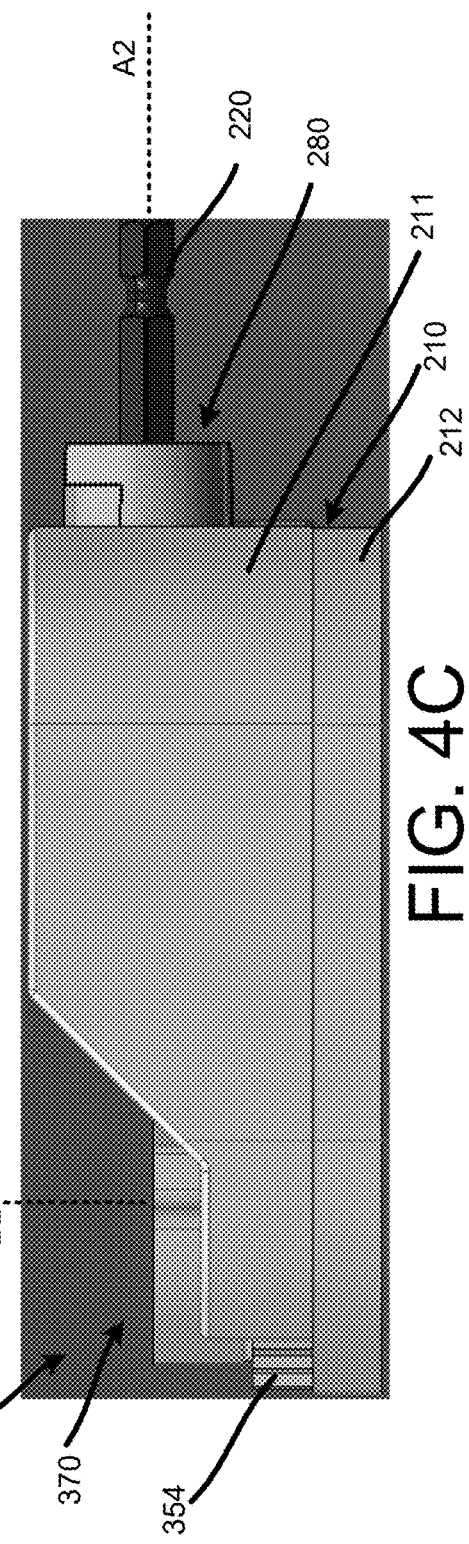
FIG. 4C is a side view of the example nut runner accessory shown in FIG. 4A.
Figure 4D:
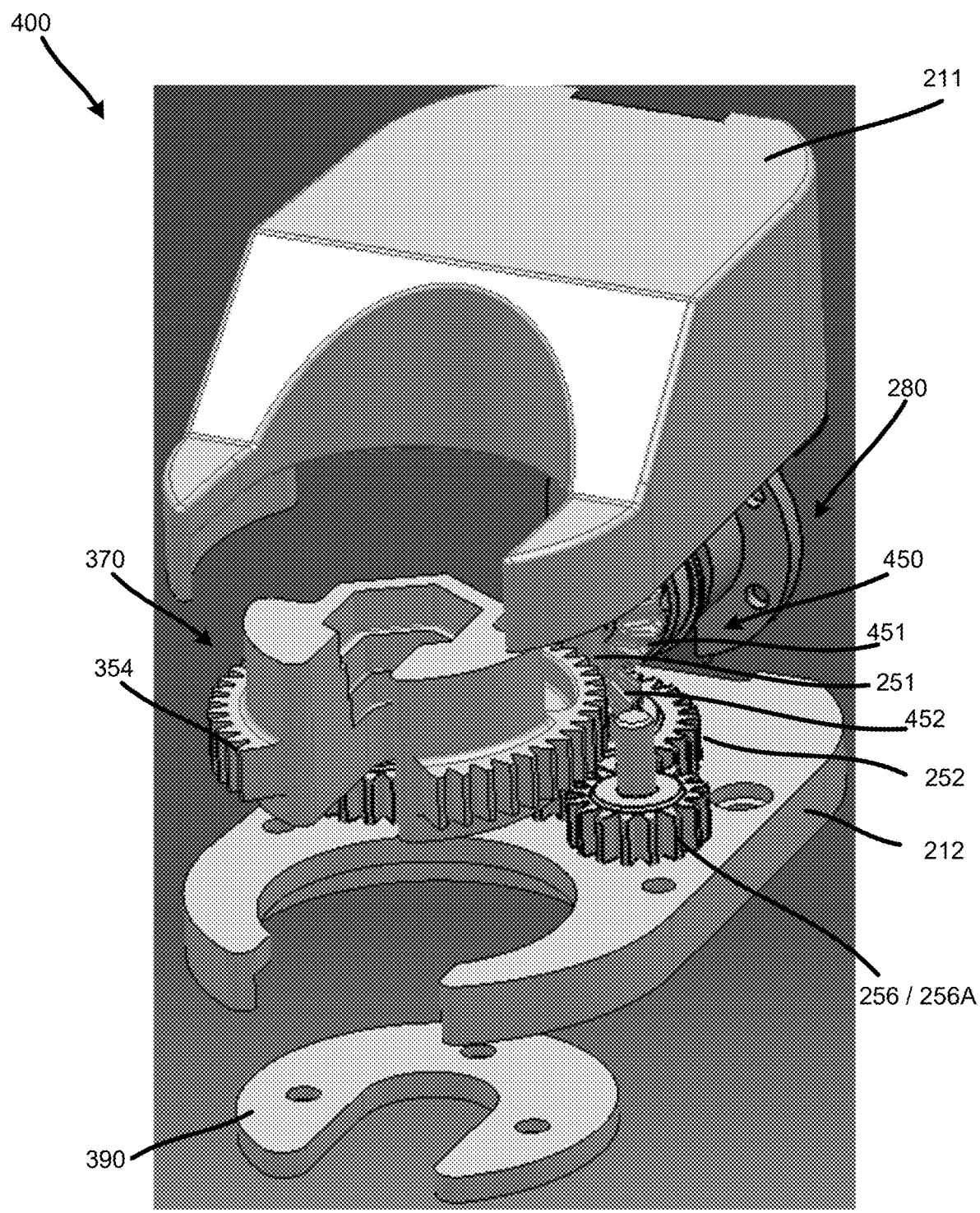
FIG. 4D and FIG. 4E are partially exploded perspective views of the nut runner accessory shown in FIGS. 4A-4C.

FIG. 4A is an assembled perspective view of an example nut runner accessory 400, in accordance with implementations described herein. FIG. 4B is a bottom plan view, and FIG. 4C is a side view, of the example nut runner accessory 400 shown in FIG. 4A. FIG. 4D is a partially exploded top perspective view, and FIG. 4E is a partially exploded bottom perspective view, of the nut runner accessory 400 shown in FIGS. 4A-4C.

The example nut runner accessory 400 shown in FIGS. 4A-4E includes the counterweighted driver head 370 described above with respect to FIGS. 3A-3E, simply for purposes of discussion and illustration. The nut runner accessory 400 can include other driver heads, such as, for example the driver head 270 described above with respect to FIGS. 2A-2E, or other driver heads.

In the example nut runner accessory 400 shown in FIGS. 4A-4E, the input shaft 220 is positioned along an input axis of operation A2 that is oriented at an angle with respect to the output axis of operation B2 of the nut runner accessory 400. In the example shown in FIGS. 4A-4E, the input axis of operation A2 is oriented substantially orthogonally to the output axis of operation B2. Orientation of the input axis of operation A2 at an angle relative to the output axis of operation B2 may allow for a different positioning of the power-driven tool 100/100' (by which the nut runner accessory 400 is driven) to provide a different orientation angle of the nut runner accessory 400 relative to a workpiece.

Figure 4E:
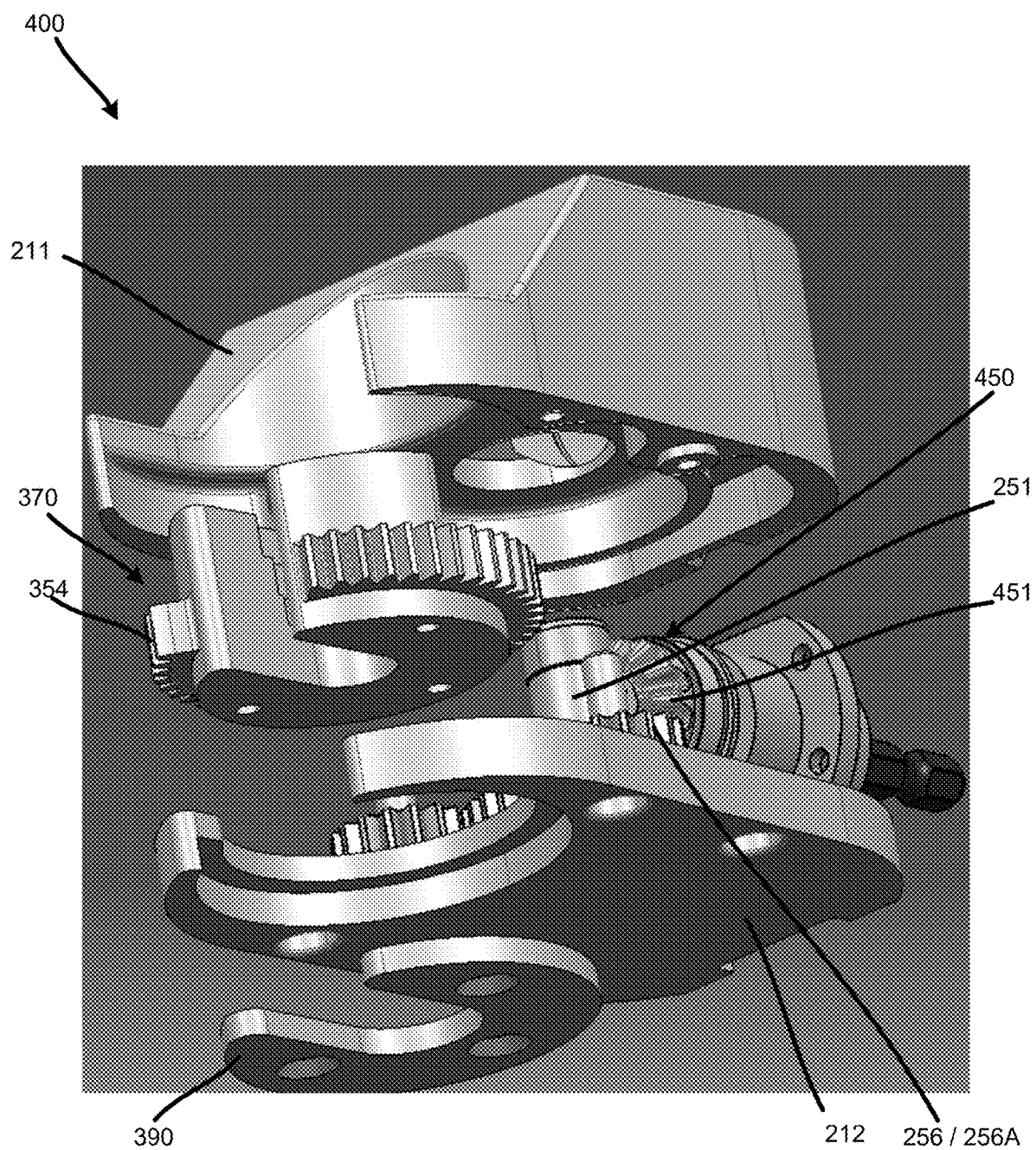

As shown in FIGS. 4D and 4E, in this example arrangement, the input shaft 220, now oriented along the input axis of operation A2, drives the input gear 252 of the gear assembly 250 via a set of bevel gears 450, that change the input axis of rotation so that the axis of rotation of the input gear 252 is parallel to the axis of rotation of the output gear 254 and the driver head 370. The set of bevel gears 450 includes a first bevel gear 451 fixed to the end of the input shaft 220, and a second bevel gear 452 in meshed engagement with the first bevel gear 451. The second bevel gear 452 is fixed to the shaft 251 to which the input gear 252 is also fixed, so that the input gear 252 rotates together with the second bevel gear 452 in response to rotation of the first bevel gear 451 fixed to the input shaft 220.

Figure 5D:
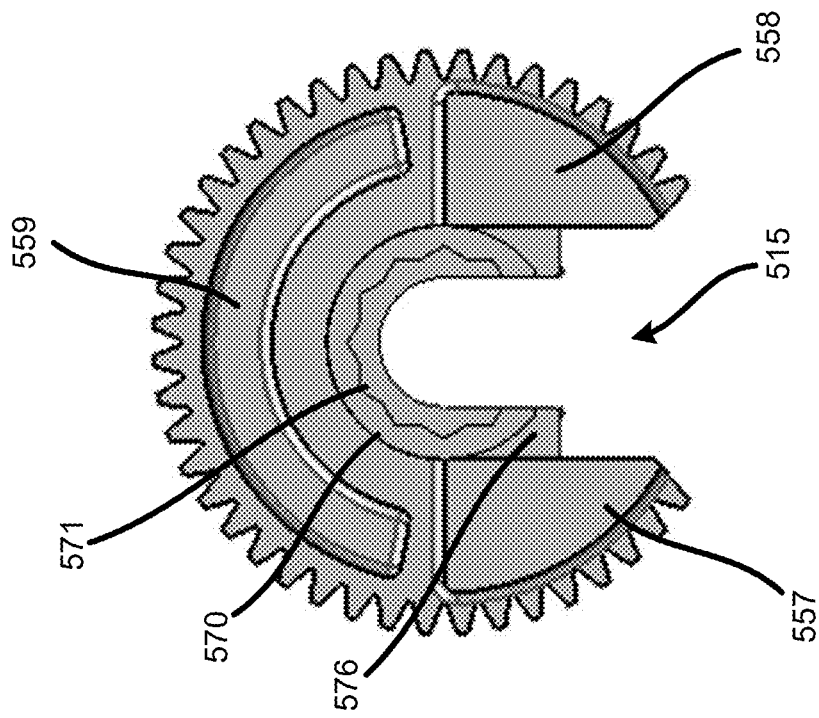
FIG. 5D is a top view of the example nut runner tool shown in FIG. 5B.
Figure 5C:
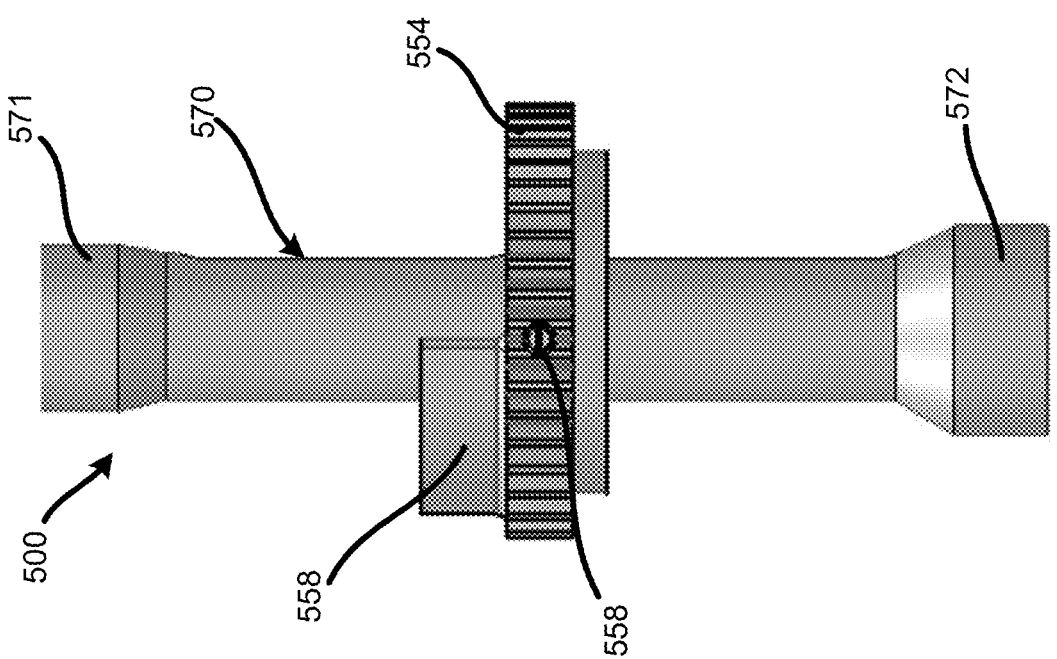
FIG. 5C is a side view.

FIG. 5A is a disassembled perspective view, and FIG. 5B is an assembled perspective view, of an example elongated split tube driver tool of a nut runner accessory, in accordance with implementations described herein. FIG. 5C is a side view, and FIG. 5D is a top view, of the assembled elongated split tube driver tool shown in FIGS. 5A and 5B. The example elongated split tube driver tool 500 shown in FIGS. 5A-5D can be used with the example nut runner accessory 200 described above with respect to FIGS. 2A-2E, and/or with the example nut runner accessory 300 described above with respect to FIGS. 3A-3D, and/or with the example nut runner accessory 400 described above with respect to FIGS. 4A-4E.

As shown in FIGS. 5A-5D, the example elongated split tube driver tool 500 includes an elongated split tube 570 that can be coupled into and removed from an output gear 554. The output gear 554 shown in FIGS. 5A-5D may replace the output gears 254, 354 described above with respect to the nut runner accessories 200, 300, 400, so that the output gear 554 is driven in response to the rotation of the input gear 252 and idler gears 256 as described above.

The elongated split tube 570 includes a first driver head 571 at a first end portion thereof, and a second driver head 572 at a second end portion thereof. The first driver head 571 and the second driver head 572 may be differently configured, including, for example, different cross-sectional diameters, different internal contours and the like, to accommodate the engagement of different sizes and/or types of nuts. In the example shown in FIGS. 5A-5D, the first and second driver heads 571, 572 have a splined, or starred, interior contour to facilitate the engagement of a nut therein, simply for purposes of discussion and illustration. An opening 575, or slit 575 may extend along a longitudinal length of the elongated split tube 570, to allow for placement of the split tube 570 and first and second driver heads 571, 572 relative to a nut to be threaded onto/off of a threaded rod.

In the example shown in FIGS. 5A-5D, a flange 576 extends along an outer circumferential portion of the split tube 570. The split tube 570 may be received in a slot 515 defined by the C-shaped contour of the output gear 554, with the flange 576 received in a corresponding slot 556 formed in the output gear 554, to set a relative position of the elongated split tube 570 and the output gear 554. In some examples, a shape and/or a contour of the flange 576 may correspond to a shape and/or a contour of the slot 556 in the output gear 554 to facilitate the coupling of the split tube 570 and the output gear 554. In some examples, the shape and/or contour of the flange 576 and the slot 556 may restrict or limit rotation of the split tube 570 received in the slot 515 of the output gear 554. For example, the flange 576 and the slot 556 may have a partial hexagonal shape and/or contour as shown in FIG. 5A. A fastener 552 such as, for example a set screw, may extend through the output gear 554 and into a corresponding recess 577 in the flange 576. Fixation of the split tube 570 relative to the output gear 554 in this manner causes the split tube 570 to rotate together with the output gear 554. The ability to easily remove and replace the split tube 570 allows for split tubes having numerous different sizes and/or configurations of driver heads to be easily attached to/detached from the tool 500, thus enhancing utility and functionality.

As shown in FIGS. 5A-5D, the example split tube driver tool 500 may include one or more counterweighting features to counteract imbalance generated during operation due to an offset between the center of rotation and the center of mass of the split tube driver tool 500, thus improving engagement with the nut to be threaded onto/off of the threaded rod, and enhancing functionality and utility. In the example shown in FIGS. 5A-5D, the example split tube driver tool 500 includes a first counterweight feature 557, in the form of a mass provided at a first end portion of the slot 515 formed in the output gear 554, and a second counterweight feature 558 in the form of a mass at a second end portion of the slot 515 formed in the output gear 554. The example split tube driver tool 500 includes a third counterweight feature 559 in the form of a recess, or a removal of mass, at a periphery of the slot 515 in which the split tube 570 is received. The one or more counterweight features 557, 558, 559 can be formed integrally with the output gear 554. The first, second and third counterweight features 557, 558, 559 shown in FIGS. 5A-5D are provided for purposes of discussion and illustration. The example split tube driver tool 500 can include more, or fewer counterweight features, arranged as shown, or differently. The one or more counterweight features may counteract imbalance generated during operation, to maintain engagement of a nut in one of the driver heads 571, 572.

Figure 6A:
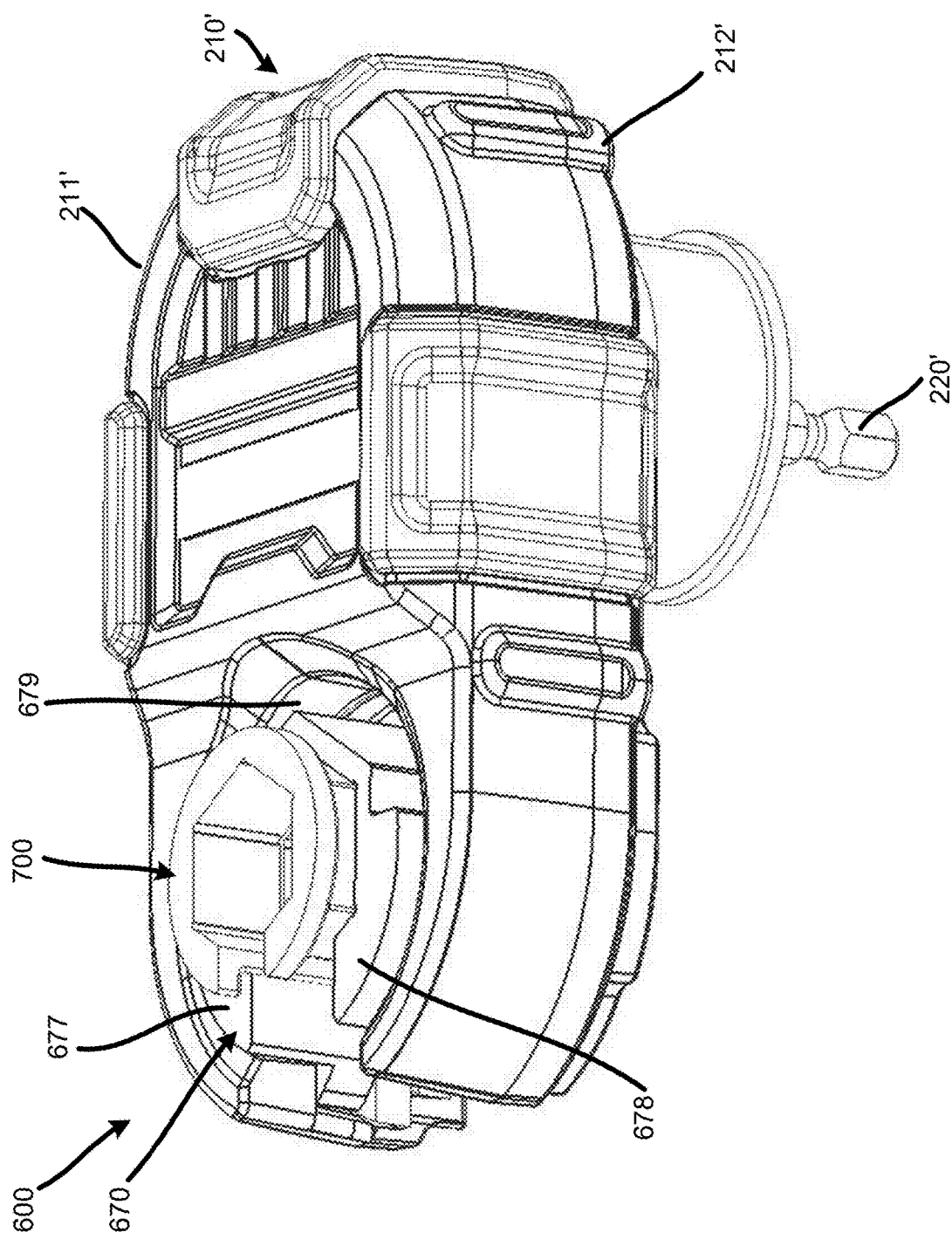
Figure 6C:
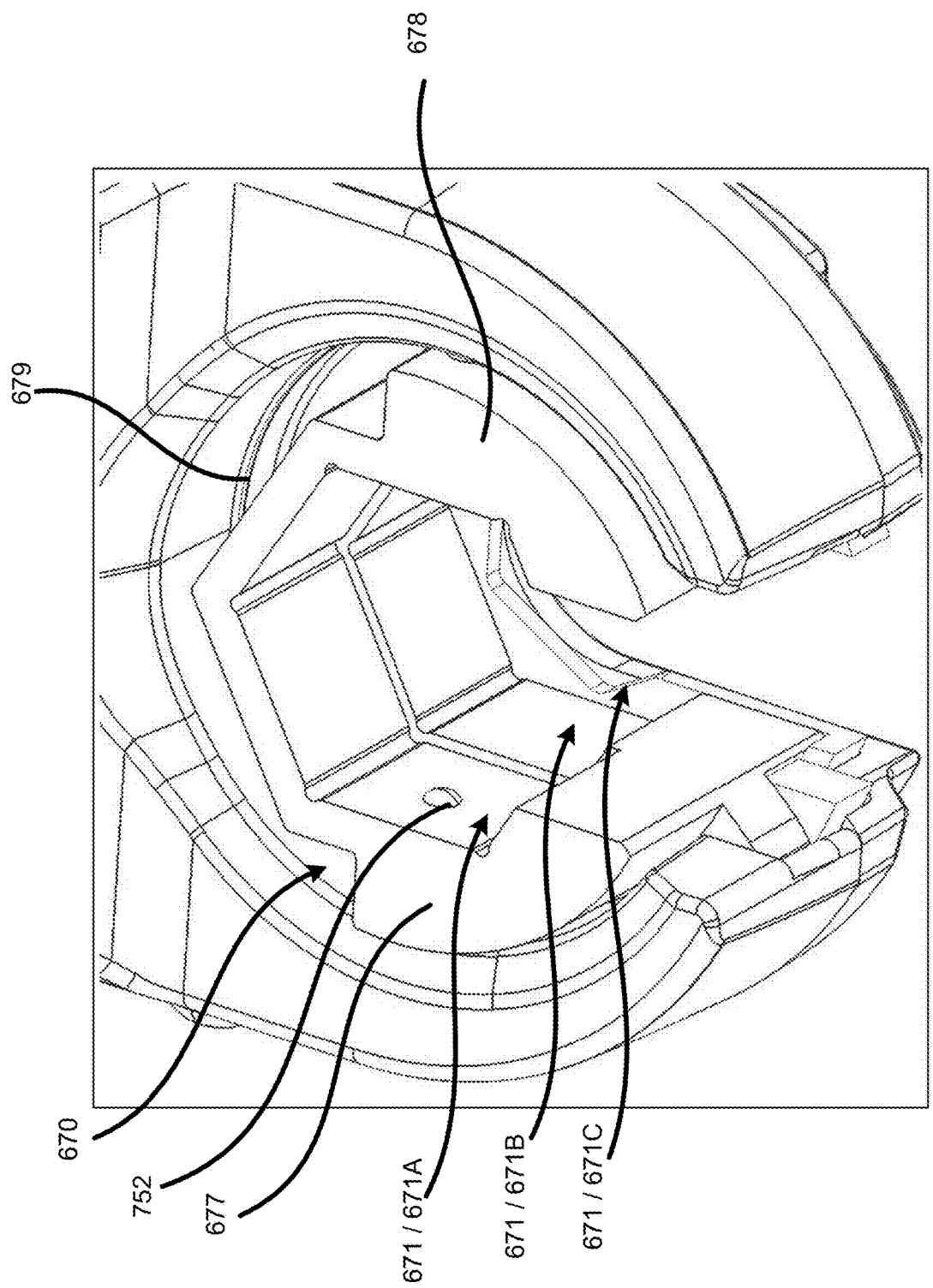
FIGS. 6C and 6D are close in views of a driver head portion of the example nut runner accessory shown in FIGS. 6A and 6B.
Figure 6D:
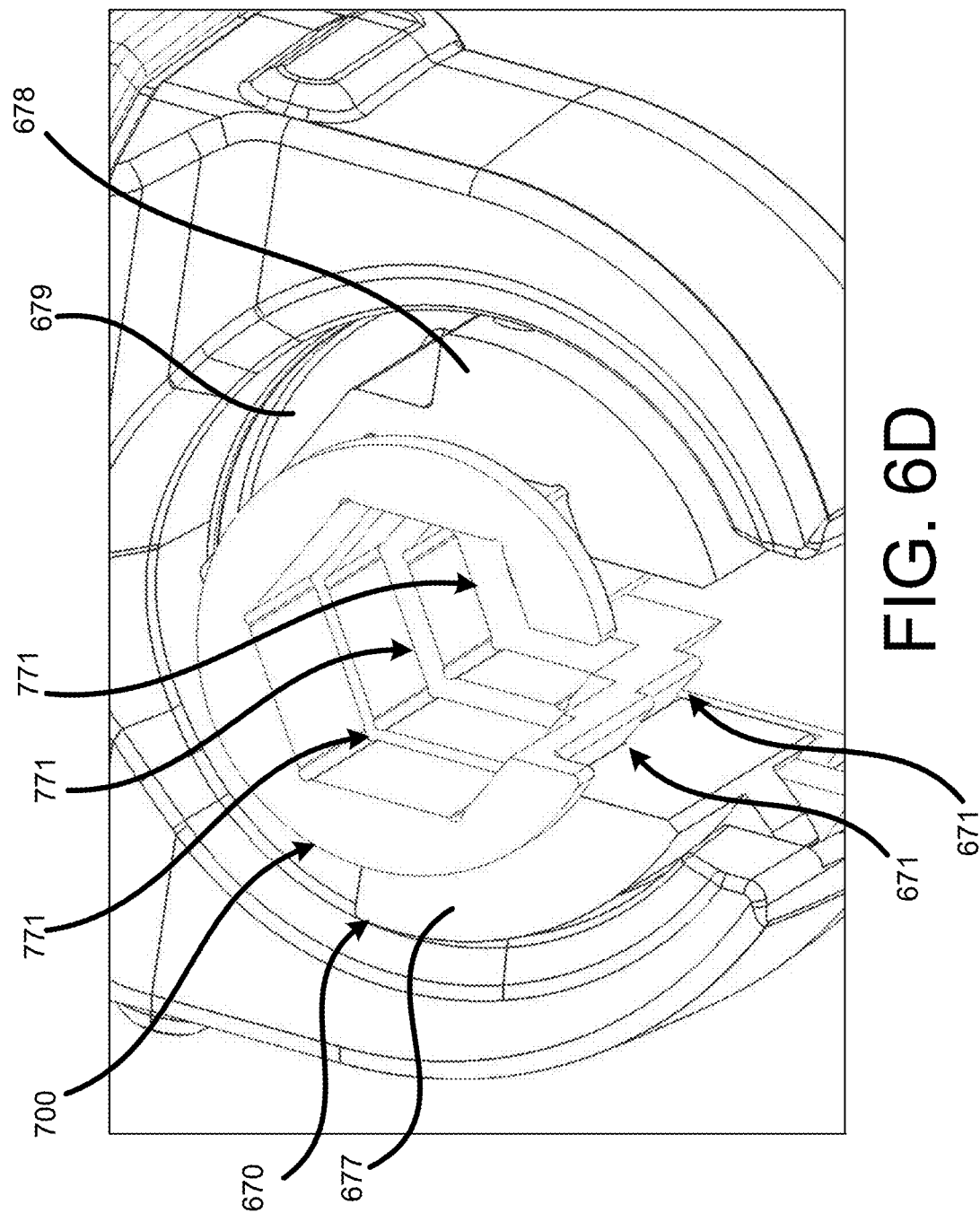
Figure 6E:
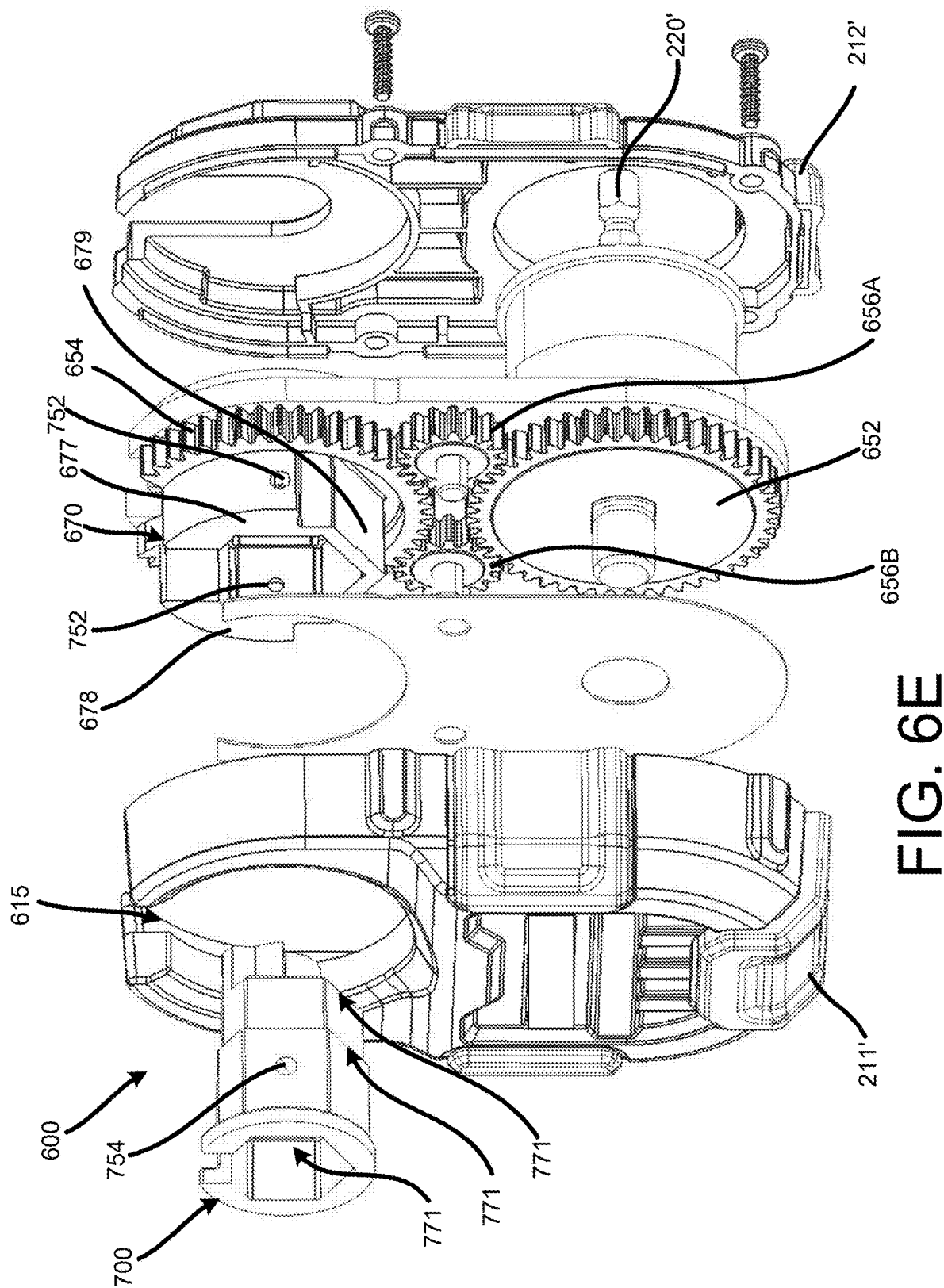
FIG. 6E is an exploded view of the example nut runner accessory shown in FIGS. 6A and 6B.
Figure 6F:
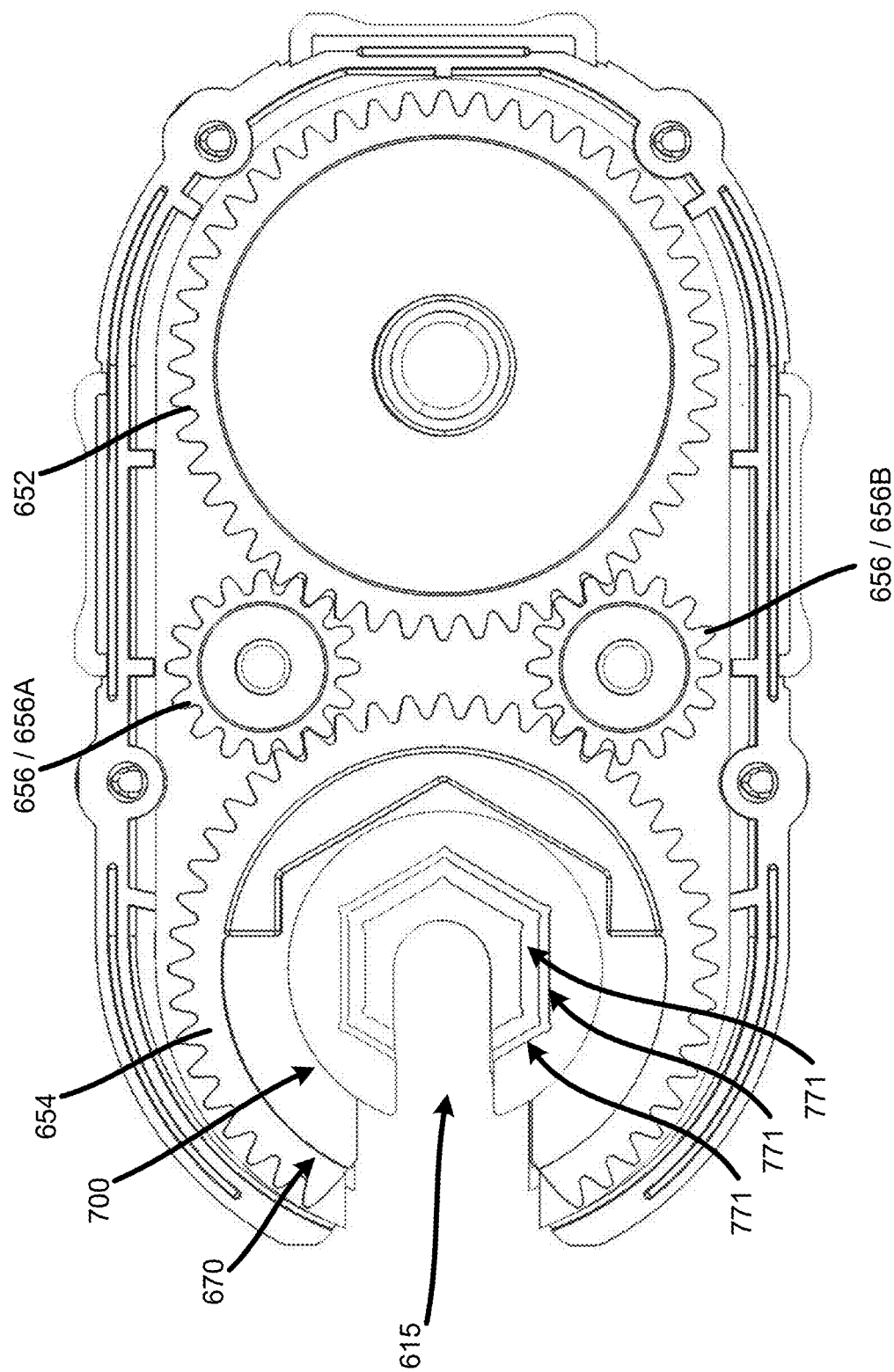
FIG. 6F is a plan view of an example gear assembly of the example nut runner accessory shown in FIGS. 6A and 6B.
Figure 7D:
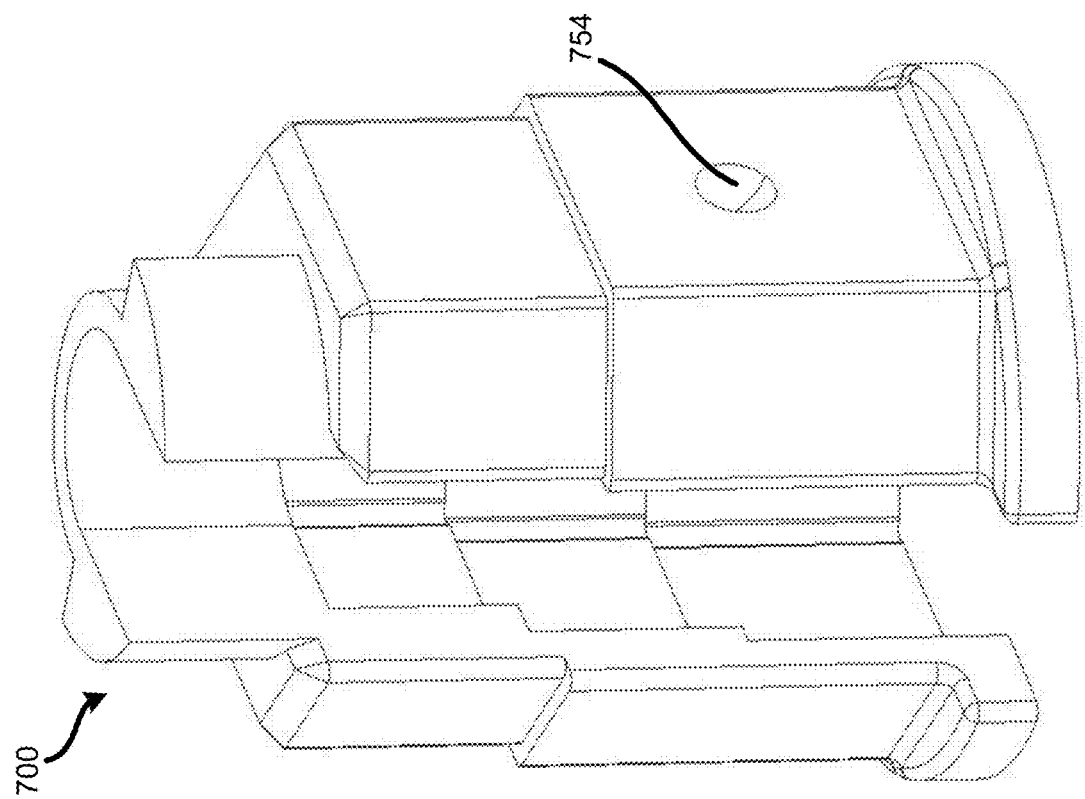
Figure 7C:
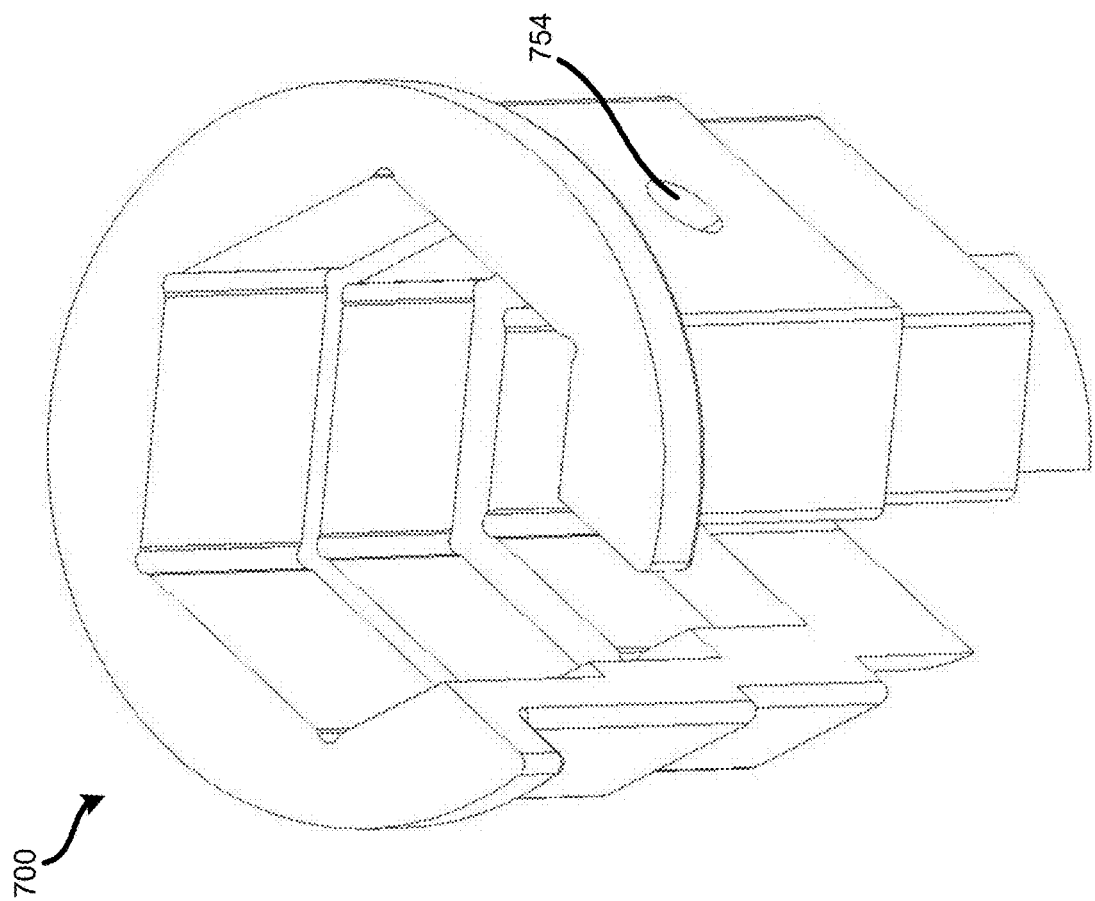

FIG. 6A is a top perspective view of an example nut runner accessory 600. FIG. 6B is a perspective view of the example nut runner accessory 600 shown in FIG. 6A, with an insert portion removed. FIG. 6C is a close in view of a driver head portion of the example nut runner accessory 600, with the insert portion removed. FIG. 6D is a close in view of the driver head portion of the example nut runner accessory 600, with the insert portion inserted. FIG. 6E is an exploded view of the example nut runner accessory 600. FIG. 6F is a plan view of an example gear assembly of the example nut runner accessory 600. FIGS. 7A-7D provide various views of the example insert portion. In particular, FIG. 7A is a top view, FIG. 7B is a front perspective view, FIG. 7C is a top perspective view, and FIG. 7D is a bottom perspective view of the example insert 700.

The example nut runner accessory 600 includes a housing 210' similar to the housing 210 as described above and having the first and second housing portions 211', 212', and an input shaft 220' configured to be coupled to the output assembly of the power-driven tool 100/100', as described above with respect to the example nut runner accessory 200 shown in FIGS. 2A-2E and/or the nut runner accessory 300 shown in FIGS. 3A-3E. The example nut runner accessory 600 includes a driver head 670 including a plurality of stepped pockets 671. The plurality of stepped pockets 671 may be formed similarly to the plurality of stepped pockets 271 formed in the driver head 270 of the example nut runner accessory 200 and/or the plurality of stepped pockets 371 formed in the driver head 370 of the example nut runner accessory 300. The example driver head 670 shown in FIGS. 6A-6F is a counterweighted driver head 670 including one or more counterweight features 677, 678, 679, similar to the counterweighted driver head 370 and including one or more counterweight features 377', 378', 379' similar to those shown in FIGS. 3A-3E. The principles to be described herein can be applied to a driver head with or without counterweight features. In the example shown in FIGS. 6A-6F, the counterweighted driver head 670 includes a first counterweight feature 677, in the form of a mass provided at a first end portion of the plurality of stepped pockets 671 formed in the driver head 670, and a second counterweight feature 678 in the form of a mass at a second end portion of the plurality of stepped pockets 671. The example driver head 670 includes a third counterweight feature 679 in the form of a recess, or a removal of mass, at a periphery of the plurality of stepped pockets 671. As with the counterweighted driver head 370 described above, the one or more counterweight features 677, 678, 679 of the counterweighted driver head 670 counteract imbalance generated during operation, to maintain engagement of a nut in one of the plurality of stepped pockets 671.

The example nut runner accessory 600 may include an insert 700 that is removably couplable to the driver head 670. In particular, the insert 700 may be removably couplable in the stepped pockets 671 formed in the driver head 670. The insert 700 may include a plurality of stepped pockets 771 configured to engage nuts of respective size/cross-sectional diameter. Cross-sectional dimensions of the stepped pockets 771 formed in the insert 700 may be less than the cross-sectional dimensions of the stepped pockets 671 of the driver head 670, such that the insertion of the insert 700 into the driver head 670 provides for engagement with nuts having different (for example, smaller) cross-sectional dimensions that that provided for by the stepped pockets 671 of the driver head 670. Thus, the ability to removably couple the insert 700 in the driver head 670 may further enhance the utility and functionality of the nut runner accessory 600 and/or the power-driven tool 100/100' to which it is coupled. Close in views of the uninstalled and installed states of the insert 700 are provided in FIGS. 6C and 6D, respectively. In this example arrangement, the driver head 670 includes two stepped pockets 671, and the insert 700 includes three stepped pockets 771, simply for purposes of discussion and illustration. The driver head 670 can include more, or fewer stepped pockets 671. In another example, the driver head 670 may have only a single step or no steps at all. Similarly, the insert 700 can include more, or fewer stepped pockets 771. Additionally, the installation of one example insert 700 is illustrated, simply for purposes of discussion and illustration. In some examples, additional inserts 700 may be inserted, for example, into a previous insert 700 to provide for engagement with nuts having progressively smaller cross-sectional diameters.

In some examples, the counterweighted driver head 670 may be formed integrally with an output gear 654 of a gear assembly 650 of the nut runner accessory 600. In other examples, the counterweighted driver head 670 may be integral with or removably coupled to the output gear 654 of the gear assembly 650. The gear assembly 650 may include an input gear 652 that is coupled to and driven by the input shaft 220. The input gear 652 is coupled to the output gear 654 by a pair of idler gears 656 (656A, 656B). The example output gear 654 has a C-shaped configuration, corresponding to the C-shaped contour of the housing 210, and the C-shaped contour of the driver head 670 and the insert 700, defining a U-shaped slot 615 allowing for positioning of the nut runner accessory 600 relative to the outer circumferential surface of the threaded rod, for the threading of a nut on the threaded rod. The transmission of force, from the input shaft 220, to the input gear 652, and to the output gear 654 via the idler gears 256, for the driving of the driver head 670 is substantially the same as previously described, and thus duplicative detailed description will be omitted.

In the example arrangement of gears 652, 654, 656 of the example gear assembly 650 shown in FIGS. 6A-6F, a diameter of or number of teeth on each of the idler gears 656 is less than a diameter of or number on the input gear 652, and less than a diameter of the output gear 654. In this example arrangement, the diameter of or number of teeth on the output gear 654 is substantially the same as the diameter of or number of teeth on the input gear 652, resulting in a substantially 1:1 gear ratio. Thus, the arrangement shown in FIGS. 6A-6F presents an example in which a rotational speed of the output gear 254 is substantially the same as the rotational speed of the input gear 252. The input gear 652, the output gear 654, and the idler gears 656 may have other relative sizes and/or combinations of sizes. In this example arrangement, the example gear assembly 650 includes two idler gears 656A, 656B in meshed engagement between the input gear 652 and the output gear 654 so that at least one of the two idler gears 656A, 656B remains in meshed engagement with the output gear 654 rotates.

As described above, the multiple stepped pockets 671 allow the example counterweighted driver head 670 to engage multiple different sizes/configurations of nuts. In particular, the example counterweighted driver head 670 shown in FIGS. 6A-6F is a multi-size hexagonal driver head including multiple stepped pockets 671, each configured to engage a different size of hexagonal nut. In this example arrangement, the four side walls of each stepped pocket 671 define four full sides and two partial sides of a hexagonal shape having a cross-sectional width corresponding to a nut to be engaged by the corresponding stepped pocket 671. The base wall of each stepped pocket 671 defines an area on which a corresponding surface of the nut is to be seated. In other embodiments, each stepped pocket 671 may fewer or more full or partial sides of a hexagonal shape or another shape, such as square, rectangular, pentagonal, or other circular, non-circular, or polygonal shapes. The stepped nature of the plurality of stepped pockets 671 having different cross-sectional widths allows the counterweighted driver head 670 to selectively receive and engage nuts having different sizes/cross-sectional widths for threading onto/off of a threaded rod by the nut runner accessory 600. Installation of the insert 700 into the portion of the driver head 670 defining the stepped pockets 671 may expand the capability of the nut runner accessory 600, providing for engagement workpieces having greater variation in size/dimension. The example driver head 670 shown in FIGS. 6A-6F is a hexagonal driver head 670 including stepped pockets 671 configured to engage a corresponding different sized nuts, simply for purposes of discussion and illustration. In some implementations, the driver head 670 may include more, or fewer, stepped pockets 671, having the same or different configurations other than the four side walled configuration shown, including more, or fewer walls, splined surfaces, a starred contour, and the like.

In some examples, a retention device 750 may provide for retention of the insert 700 in the installed state within the stepped portion of the driver head 670. In particular, the retention device 750 may provide for axial retention of the insert 700 installed within the stepped portion of the driver head 670. In some examples, the retention device 750 may include a first retention portion 752 provided on the driver head 670, and a second retention portion 754 provided on the insert 700. In some examples, the first retention portion 752 may include, for example, a spring loaded ball positioned in the wall portion of one of the stepped pockets of the driver head 670. The ball may be radially biased, for example, radially inward toward a central portion of the stepped portion of the driver head 670. The second retention portion 754 may be formed in an outer wall portion of the insert 700. For example, the second retention portion 754 may be a recess, or depression, or divot, formed in a portion of the outer wall of the insert. A shape of the second retention portion 754 may correspond to a shape of the first retention portion 752, i.e., to a shape of the ball of the first retention portion 752. The second retention portion 754 may be formed in a portion of the outer wall of the insert corresponding to a position of the first retention portion 752 when the insert 700 is installed and properly seated in the stepped portion of the driver head 670. Insertion of the insert 700 into the stepped portion of the driver head 670 may exert a force on the first retention portion 752, i.e., outward radial movement of the ball and compression of the spring of the first retention portion 752 as the outer wall of the insert 700 moves along the corresponding inner wall portion of the stepped portion of the driver head 670. As the second retention portion 754 moves into place with respect to the first retention portion, the ball of the first retention portion 752 is forced into the recess of the second retention portion 754 due to the biasing action of the spring of the first retention portion 752, to engage the first and second retention portion s 752, 754 of the retention device 750. In this manner, the retention device 750 may retain an axial position of the insert 700 in the driver head 670 until the insert 700 is removed by the user.

The retention is described with respect to one first retention portion 752 and a corresponding second retention portion 754, simply for purposes of discussion and illustration. Multiple retention devices 750 each including a first retention portion 752 and a second retention portion 754 can be incorporated into the coupling of the insert 700 and the driver head 670. Similarly, the first retention portion 752 as described may instead be incorporated into the outer wall portion of the insert 700, and the second retention portion 754 as described can instead be incorporated into the inner wall portion of the stepped portion of the driver head 670.

In the following, some examples are described.

Example 1: A nut runner accessory for a power-driven tool, including a housing; an input shaft at least partially received in the housing, the input shaft having a first end portion configured to receive a rotary input torque from a power-driven tool; a gear assembly received in the housing, including an input gear configured to receive rotary input from the input shaft, and an output gear configured to be rotatably driven in response to rotation of the input gear; and a driver head coupled to an output gear of the gear assembly, wherein the driver head is configured to be rotatably driven about an output axis in response to rotation of the output gear, wherein the driver head includes: a base defining a slot having an open end portion; and a plurality of stepped pockets extending from the base along the output axis, each stepped pocket of the plurality of stepped pockets including a base wall; and a plurality of side walls extending upward from the base wall.

Example 2: The nut runner accessory of example 1, wherein each of the plurality of stepped pockets has a different cross-sectional dimension corresponding to a nut to be engaged by the respective stepped pocket.

Example 3: The nut runner accessory of example 1, wherein the base of the driver head is configured to be removably coupled to the output gear such that the driver head rotates together with the output gear.

Example 4: The nut runner accessory of example 3, wherein the output gear includes a slot having an open end portion, corresponding to the slot having the open end portion defined by the base of the driver head.

Example 5: The nut runner accessory of example 1, wherein the plurality of side walls extend substantially orthogonally upward from the base wall; and the plurality of side walls includes at least three side walls corresponding to at least three sides of a polygonal nut to be engaged by the respective stepped pocket.

Example 6: The nut runner accessory of example 1, further comprising one or more counterweight features defined on the driver head, wherein the one or more counterweight features are positioned to counteract an imbalance generated during operation due to an offset between a center of rotation and a center of mass of the driver head.

Example 7: The nut runner accessory of example 6, wherein the one or more counterweight features includes a first counterweight feature defined by a first mass positioned at a first end of the plurality of stepped pockets corresponding to a first side of the open end portion of the slot; and a second counterweight feature defined by a second mass positioned at a second end of the plurality of stepped pockets corresponding to a second side of the open end portion of the slot.

Example 8: The nut runner accessory of example 1, further comprising a first idler gear and a second idler gear positioned between the input gear and the output gear of the gear assembly, wherein at least one of the first idler gear or the second idler gear is configured be in meshed engagement between the input gear and the output gear as the output gear and the driver head coupled thereto rotate in response to rotation of the input gear.

Example 9: The nut runner accessory of example 1, wherein the gear assembly is configured such that a rotational speed of the driver head is less than a rotational speed of the input shaft.

Example 10: The nut runner accessory of example 1, wherein the housing is configured to be coupled to a brace assembly that is coupled to the power-driven tool to stabilize the housing relative to the power tool.

Example 11: A nut runner accessory for a power-driven tool, including a housing; an input shaft at least partially received in the housing and configured to be to be driven rotatably by a power-driven tool; a gear assembly received in the housing, including an input gear configured to be rotatably driven in response to rotation of the input shaft and an output gear configured to be rotatably driven about an output axis upon rotation of the input gear; a counterweighted driver head provided on an output gear of the gear assembly so as to rotate together with the output gear, wherein the output gear and the counterweighted driver head define a slot having an open end portion; and one or more counterweight features provided on at least one of the driver head or the output gear to counteract an imbalance generated during operation due to an offset between the center of rotation and the center of mass of the driver head.

Example 12: The nut runner of example 11, wherein the counterweight features are configured such that a center of rotation of the driver head and output gear coincides or approximately coincides with a center of mass of the driver head and output gear.

Example 13: The nut runner accessory of example 11, wherein the one or more counterweight features includes: a first counterweight feature defined by a first mass positioned at a first side of the open end portion of the slot; and a second counterweight feature defined by a second mass positioned at a second side of the open end portion of the slot.

Example 14: The nut runner accessory of example 13, further comprising a third counterweight feature defined by a recess formed in an upper portion of the output gear, corresponding to an outer periphery of the driver head.

Example 15: The nut runner accessory of example 11, wherein the driver head and the output gear are integrally formed.

Example 16: The nut runner accessory of example 11, wherein the driver head includes a plurality of stepped pockets extending upward from an upper portion of the output gear and facing the open end portion of the slot, each stepped pocket of the plurality of stepped pockets including: a base wall; and a plurality of side walls extending upward from the base wall.

Example 17: The nut runner accessory of example 16, wherein each of the plurality of stepped pockets has a different cross-sectional dimension corresponding to a nut to be engaged by the respective stepped pocket.

Example 18: The nut runner accessory of example 16, wherein the plurality of side walls extend substantially orthogonally upward from the base wall; and the plurality of side walls includes four side walls corresponding to four sides of a hexagonal nut to be engaged by the respective stepped pocket.

Example 19: The nut runner accessory of example 11, wherein the driver head includes an elongated tube having a first driver engagement socket at one end of the tube.

Example 20: The nut runner accessory of example 19, wherein the elongated tube is a split tube having a substantially C-shaped cross-section.

Example 21: The nut runner accessory of example 19, wherein the driver head includes a second driver engagement socket at a second end of the tube.

Example 22: The nut runner accessory of example 19, wherein the first socket has an at least partially hex shape or splined configuration.

Example 23: The nut runner accessory of example 19, wherein the counterweight features comprise a first counterweight feature defined by a first mass positioned at a first side of the open end portion of the slot in the output gear and a second counterweight feature defined by a second mass positioned at a second side of the open end portion of the slot in the output gear.

Example 24: A nut runner accessory for a power-driven tool, including a housing; an input shaft at least partially received in the housing, the input shaft having a first end portion configured to receive a rotary input torque from a power-driven tool; a gear assembly received in the housing, including an input gear configured to receive rotary input from the input shaft, and an output gear configured to be rotatably driven in response to rotation of the input gear; a driver head coupled to an output gear of the gear assembly, wherein the driver head is configured to be rotatably driven about an output axis in response to rotation of the output gear, wherein the driver head includes a socket member configured to drive a nut along a threaded shaft; and an engagement structure coupled to the housing adjacent the input shaft, the engagement structure configured to couple the housing to an external tool.

Example 25: The nut runner accessory of example 24, wherein the engagement structure is configured to be coupled to a brace assembly that is coupled to a power tool housing to stabilize the nut runner accessory housing relative to the power tool housing.

Example 26: The nut runner accessory of example 24, wherein the engagement structure comprises a cylindrical coupling member; a flange extending radially outward from an intermediate portion of the cylindrical coupling member and coupled to a housing of the accessory tool, such that a first portion of the cylindrical coupling member is positioned within the housing and a second portion of the cylindrical coupling member is positioned outside of the housing; a first L-shaped slot and a second L-shaped slot defined in an outer circumferential portion of the second portion of the housing; and a radial tab rotatably coupled between the flange and the second portion of the cylindrical coupling member, wherein the tab is biased in a direction away from the flange.

Example 27: The engagement structure of example 26, wherein the first L-shaped slot and the second L-shaped slot are formed at diametrically opposed positions on the outer circumferential portion of the second portion of the cylindrical coupling member.

Example 28: The engagement structure of example 26, wherein
   the first L-shaped slot is configured to be slidably received and engaged in a corresponding first recess defined a cylindrical coupling member of an engagement structure of a mating device; and the second L-shaped slot is configured to be slidably received and engaged in a corresponding second recess defined the cylindrical coupling member of the engagement structure of the mating device.

Example 29: The engagement structure of example 26, wherein the cylindrical coupling member is positioned around an input shaft extending through the housing, wherein a first portion of the input shaft is received within the housing and a second portion of the input shaft is positioned outside of the housing.

Example 30: The engagement structure of example 29, further comprising a coupling nut coupled to the second portion of the input shaft and a sleeve positioned between the coupling nut and the second portion of the cylindrical coupling member, wherein the first portion of the input shaft is configured to receive a force from an external device coupled thereto by the engagement structure; and an end of the second portion of the input shaft is fixed to an input gear within the housing such that the input shaft is configured to transmit the force received from the external device to the input gear to drive the input gear.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A nut runner accessory for a power-driven tool, including:
    a housing;
    an input shaft at least partially received in the housing, the input shaft having a first end portion configured to receive a rotary input torque from a power-driven tool;
    a gear assembly received in the housing, including an input gear configured to receive rotary input from the input shaft, and an output gear configured to be rotatably driven in response to rotation of the input gear; and
    a driver head coupled to the output gear of the gear assembly, wherein the driver head is configured to be rotatably driven about an output axis in response to rotation of the output gear, wherein the driver head includes:
        a base defining a slot having an open end portion;
        a plurality of stepped pockets coupled to the base along the output axis, each stepped pocket of the plurality of stepped pockets including a base wall and a plurality of side walls extending upward from the base wall; and
        one or more counterweight features defined on the driver head, wherein the one or more counterweight features are configured to move a center of mass of the driver head towards the output axis;
        wherein at least one of the one or more counterweight features is defined by a radial wall thickness of the driver head adjacent the slot that is greater than a radial wall thickness of the driver head on a side opposing the slot.

2. The nut runner accessory of claim 1, wherein each of the plurality of stepped pockets has a different cross-sectional dimension corresponding to a nut to be engaged by a respective one of the plurality of stepped pockets.

3. The nut runner accessory of claim 1, wherein the base of the driver head is configured to be removably coupled to the output gear such that the driver head rotates together with the output gear.

4. The nut runner accessory of claim 1, wherein
    each of the plurality of side walls extends substantially orthogonally upward from an adjacent base wall; and
    the plurality of side walls includes at least two side walls corresponding to at least two sides of a polygonal nut to be engaged by a respective stepped pocket of the plurality of stepped pockets.

5. The nut runner accessory of claim 1, wherein the one or more counterweight features includes:
    a first counterweight feature defined by a first mass positioned at a first end of the plurality of stepped pockets corresponding to a first side of the open end portion of the slot; and
    a second counterweight feature defined by a second mass positioned at a second end of the plurality of stepped pockets corresponding to a second side of the open end portion of the slot.

6. The nut runner accessory of claim 1, wherein the output gear includes a slot having an open end portion, corresponding to the slot having the open end portion defined by the base of the driver head, and wherein the gear assembly further comprises a first idler gear and a second idler gear positioned between the input gear and the output gear of the gear assembly, wherein
    at least one of the first idler gear or the second idler gear is configured be in meshed engagement between the input gear and the output gear as the output gear and the driver head coupled thereto rotate in response to rotation of the input gear.

7. The nut runner accessory of claim 1, wherein the plurality of stepped pockets are formed in the base.

8. The nut runner accessory of claim 1, wherein the plurality of stepped pockets is a first plurality of stepped pockets, the nut runner accessory further comprising an insert configured to be removably coupled to and rotate together with the driver head, the insert including a second stepped pocket.

9. A nut runner accessory for a power-driven tool, including:
- a housing;
- an input shaft at least partially received in the housing and configured to be to be driven rotatably by a power-driven tool;
- a gear assembly received in the housing, including an input gear configured to be rotatably driven in response to rotation of the input shaft and an output gear configured to be rotatably driven upon rotation of the input gear;
- a driver head coupled to the output gear of the gear assembly and rotatable about an output axis, wherein the output gear and the driver head define a slot having an open end portion; and
- one or more counterweight features provided on at least one of the driver head or the output gear that are configured to move a center of mass of the driver head and output gear towards the output axis;
- wherein at least one of the one or more counterweight features is defined by a radial wall thickness of the driver head adjacent the slot that is greater than a radial wall thickness of the driver head on a side opposing the slot.

10. The nut runner accessory of claim 9, wherein the one or more counterweight features are configured such that a center of rotation of the driver head and output gear coincides or approximately coincides with a center of mass of the driver head and output gear.

11. The nut runner accessory of claim 9, wherein the one or more counterweight features includes:
- a first counterweight feature defined by a first mass positioned at a first side of the open end portion of the slot; and
- a second counterweight feature defined by a second mass positioned at a second side of the open end portion of the slot.

12. The nut runner accessory of claim 9, wherein the driver head and the output gear are integrally formed.

13. The nut runner accessory of claim 9, further comprising a plurality of stepped pockets coupled to the driver head, each stepped pocket of the plurality of stepped pockets including:
- a base; and
- a plurality of side walls extending upward from the base.

14. The nut runner accessory of claim 13, wherein each of the plurality of stepped pockets has a different cross-sectional dimension corresponding to a nut to be engaged by a respective stepped pocket of the plurality of stepped pockets.

15. The nut runner accessory of claim 13, wherein the plurality of stepped pockets are formed in the base.

16. The nut runner accessory of claim 13, further comprising an insert configured to be coupled to and rotate together with the base, the insert including the plurality of stepped pockets.

17. The nut runner accessory of claim 9, wherein
- the driver head includes an elongated split tube having a substantially C-shaped cross-section, with a first driver engagement socket at a first end of the elongated split tube and a second driver engagement socket at a second end of the elongated split tube, and
- at least one of the first driver engagement socket or the second driver engagement socket has an at least partially hex shape or splined configuration.

18. The nut runner accessory of claim 9, wherein the one or more counterweight features includes a recess adjacent the side opposing the slot.

19. The nut runner accessory of claim 18, wherein the recess is located in a side wall of the output gear.

* * * * *